United States Patent
Miyoshi et al.

(10) Patent No.: US 12,266,774 B2
(45) Date of Patent: Apr. 1, 2025

(54) BATTERY DEVICE AND METHOD FOR MANUFACTURING BATTERY DEVICE

(71) Applicant: HONDA MOTOR CO., LTD., Tokyo (JP)

(72) Inventors: Kyosuke Miyoshi, Saitama (JP); Shoshi Hidaka, Saitama (JP); Ryu Tate, Saitama (JP); Hideaki Sakai, Saitama (JP); Yoshiatsu Asai, Saitama (JP); Satoshi Takada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1022 days.

(21) Appl. No.: 17/259,561

(22) PCT Filed: Jul. 17, 2018

(86) PCT No.: PCT/JP2018/026756
§ 371 (c)(1),
(2) Date: Jan. 12, 2021

(87) PCT Pub. No.: WO2020/016937
PCT Pub. Date: Jan. 23, 2020

(65) Prior Publication Data
US 2021/0234211 A1    Jul. 29, 2021

(51) Int. Cl.
*H01M 10/647* (2014.01)
*H01M 10/653* (2014.01)
(Continued)

(52) U.S. Cl.
CPC ....... *H01M 10/647* (2015.04); *H01M 10/653* (2015.04); *H01M 10/6551* (2015.04);
(Continued)

(58) Field of Classification Search
CPC ............ H01M 50/267; H01M 50/209; H01M 50/213; H01M 50/531; H01M 50/249;
(Continued)

(56) References Cited

U.S. PATENT DOCUMENTS 11,247,572 B2 *  2/2022  Wuensche ........... H01M 50/244
2005/0123825 A1 *  6/2005  Nakamura .......... H01M 50/503
429/100

(Continued)

FOREIGN PATENT DOCUMENTS

CN       102163734 A      8/2011
CN       204732459 U     10/2015
(Continued)

OTHER PUBLICATIONS

Eng translation JP-5579322-B2 (Year: 2014).*
Eng translation JP-2014072055-A (Year: 2014).*

*Primary Examiner* — Stephen J Yanchuk
(74) *Attorney, Agent, or Firm* — CKC & Partners Co., LLC

(57) ABSTRACT

A battery device is provided with: an exterior body having two outer side walls; a plurality of battery cell groups that are arranged in parallel between the two outer side walls and that are each composed of a plurality of laminated battery cells; and holding mechanisms that are arranged between the plurality of battery cell groups and that hold the plurality of respective battery cell groups in the exterior body by applying, to the plurality of battery cell groups, a pressing force in a direction in which the battery cell groups are separated from each other and are pressed towards the two opposite outer side walls.

20 Claims, 36 Drawing Sheets

(51) Int. Cl.
*H01M 10/6551* (2014.01)
*H01M 10/6556* (2014.01)
*H01M 50/209* (2021.01)
*H01M 50/249* (2021.01)
*H01M 50/262* (2021.01)
*H01M 50/264* (2021.01)
*H01M 50/291* (2021.01)

(52) U.S. Cl.
CPC ..... *H01M 10/6556* (2015.04); *H01M 50/209* (2021.01); *H01M 50/249* (2021.01); *H01M 50/262* (2021.01); *H01M 50/264* (2021.01); *H01M 50/291* (2021.01)

(58) Field of Classification Search
CPC ............ H01M 50/262; H01M 50/264; H01M 50/291; H01M 10/647; H01M 10/625; H01M 10/6554; H01M 2220/20; Y02E 60/10
See application file for complete search history.

(56) References Cited

U.S. PATENT DOCUMENTS

| | | | |
|---|---|---|---|
| 2006/0273758 A1* | 12/2006 | Sanada | H01M 50/557 320/107 |
| 2008/0193830 A1* | 8/2008 | Buck | H01M 10/613 429/120 |
| 2011/0200862 A1 | 8/2011 | Kurosawa | |
| 2012/0263991 A1 | 10/2012 | Temmyo et al. | |
| 2015/0171492 A1 | 6/2015 | Ramsayer et al. | |

FOREIGN PATENT DOCUMENTS

| | | | | |
|---|---|---|---|---|
| JP | 2008108651 | A | | 5/2008 |
| JP | 2012146403 | A | | 8/2012 |
| JP | 2013069657 | A | | 4/2013 |
| JP | 2014072055 | A | * | 4/2014 |
| JP | 5579322 | B2 | * | 8/2014 ......... H01M 10/613 |
| JP | 2015520924 | A | | 7/2015 |
| JP | 2016184470 | A | | 10/2016 |
| JP | 2017050164 | A | | 3/2017 |
| WO | 2012073415 | A1 | | 6/2012 |

* cited by examiner

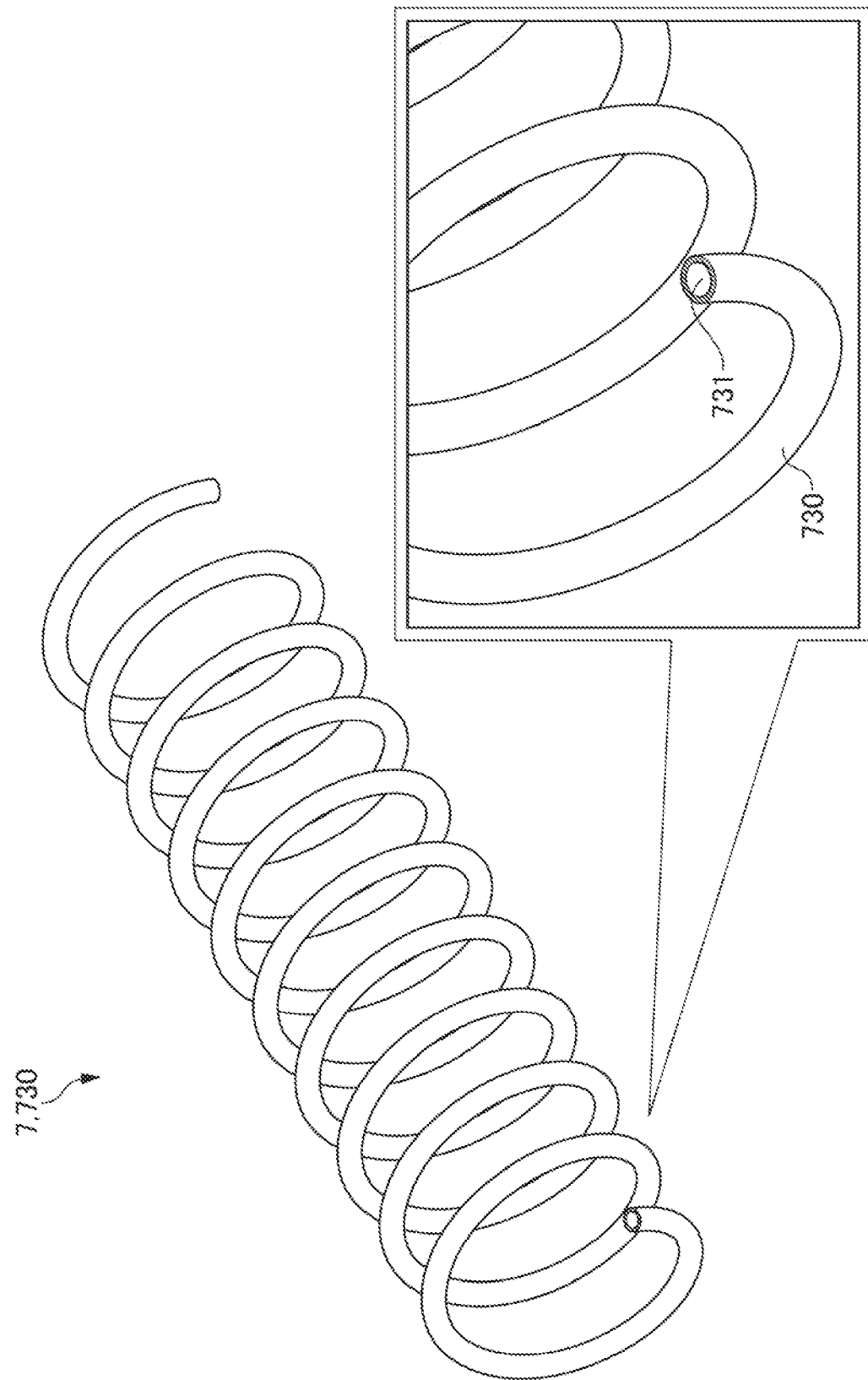

FIG. 15A
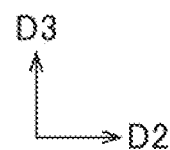
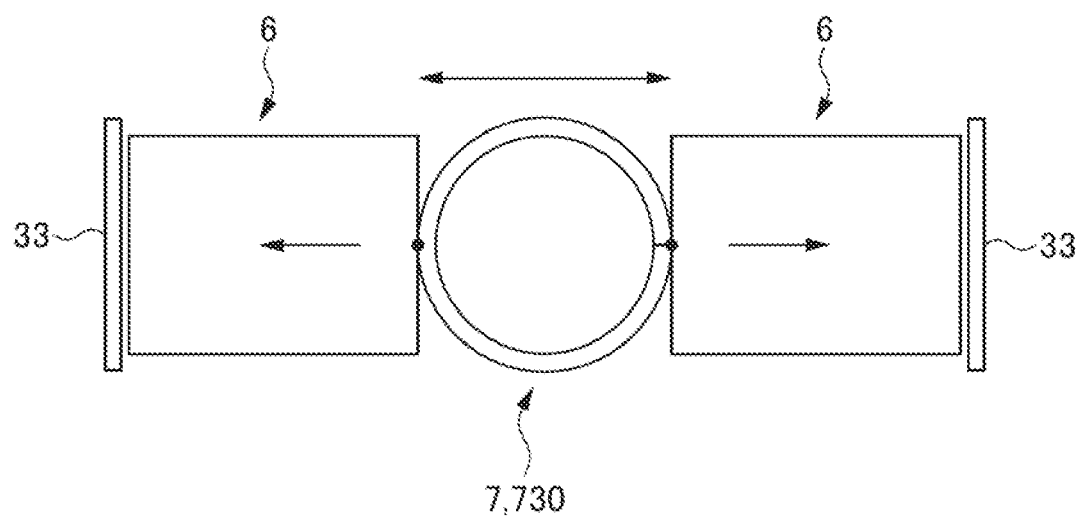

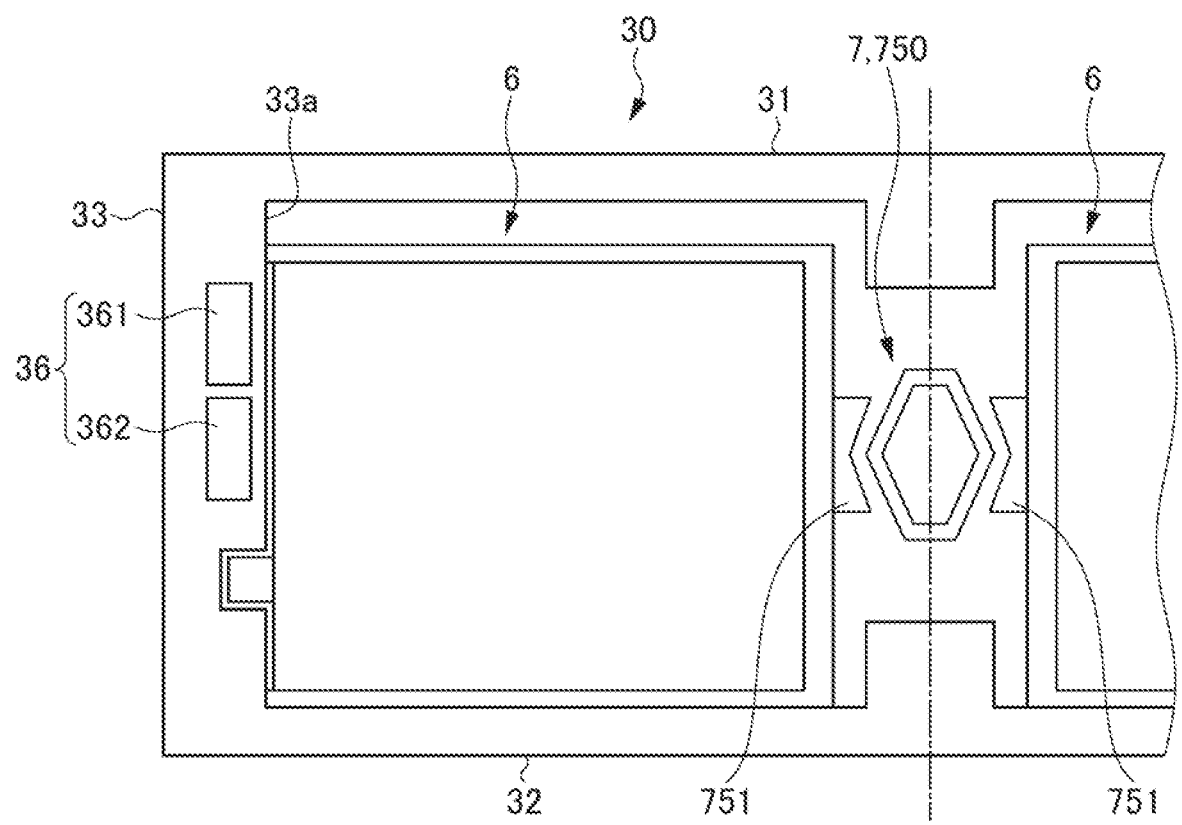

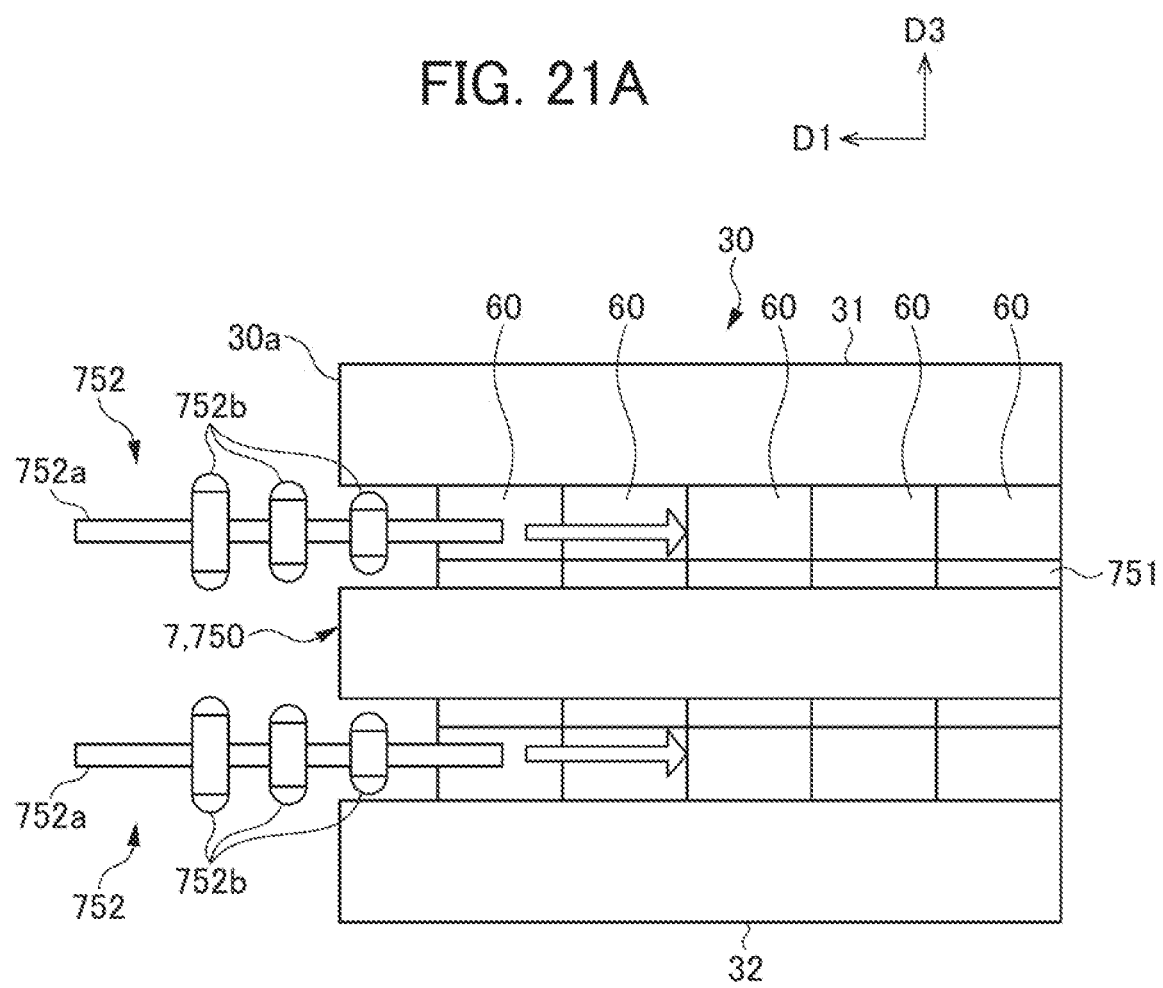

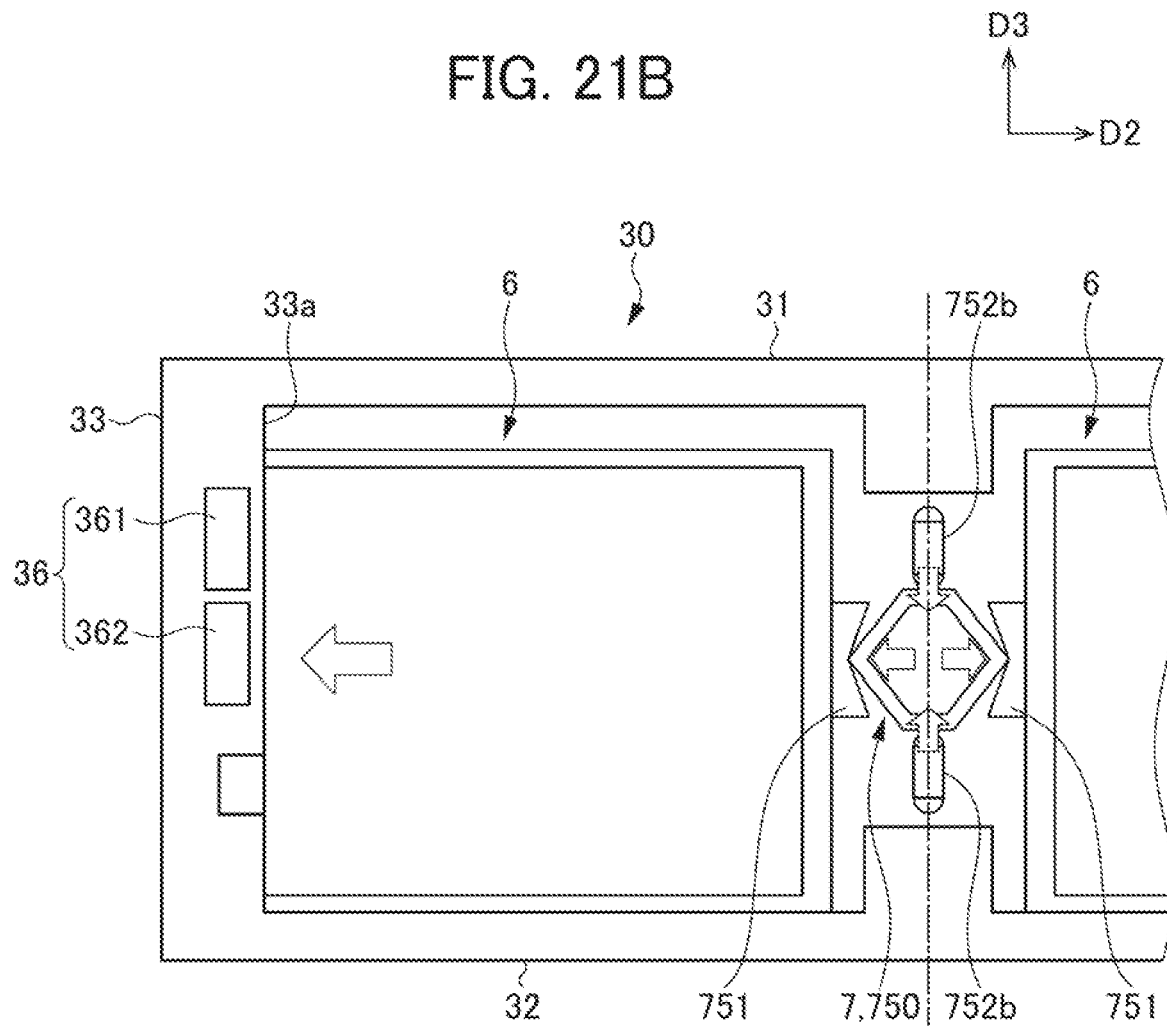

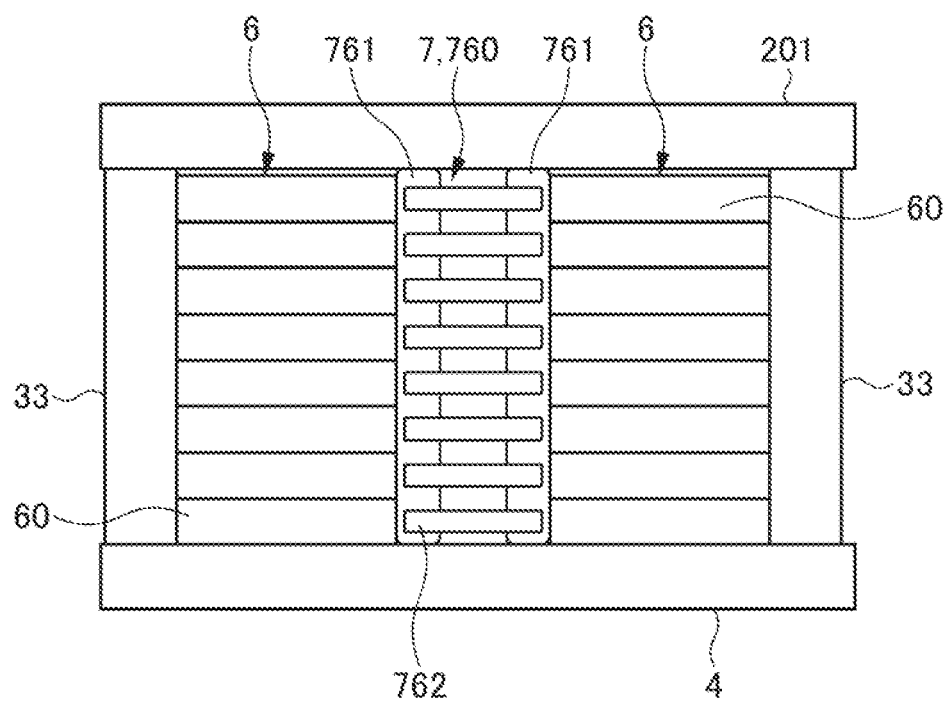

BATTERY DEVICE AND METHOD FOR MANUFACTURING BATTERY DEVICE

TECHNICAL FIELD

The present invention relates to a battery device and a method for manufacturing a battery device.

BACKGROUND ART

A battery device having a battery cell such as a lithium ion secondary battery is equipped to hybrid cars and electric vehicles. Generally, these vehicles require greater electrical power than a normal gasoline vehicle. In order to handle high electrical current, the battery device is demanded to be made high density by laminating many battery cells which should be in a limited space. In addition, in this case, it is also necessary for each of the battery cells to be retained within the battery device so that there is no rattling by vibration of the vehicle or the like.

Conventionally, a battery device has been known which is made by respectively providing fixing protrusions of pin shape to the bottom of cell casings of each battery cell for the fixing of the battery cells, and tightening and fixing each battery cell placed on a cooling plate to the cooling plate by the fixing protrusions which penetrate the cooling plate (for example, refer to Patent Document 1).

Patent Document 1: Japanese Unexamined Patent Application (Translation of PCT Application), Publication No. 2015-520924

DISCLOSURE OF THE INVENTION

Problems to be Solved by the Invention

However, with the technology disclosed in Patent Document 1, there is a problem in that the battery cells must be tightened and fixed to the cooling plate one by one in order to retain the battery cells, and thus the assembly workability of the battery device is poor.

The present invention has an object of providing a battery device and a method for manufacturing a battery device which can equip a plurality of battery cells with high density, and can easily retain the plurality of battery cells.

Means for Solving the Problems

A battery device (for example, the battery device 1 described later) according to a first aspect of the present invention includes: an outer packaging (for example, the outer packaging 30 described later) having two outer side walls (for example, the outer side wall 33 described later); a plurality of battery cell groups (for example, the battery cell group 6 described later) disposed in parallel between the two outer side walls, and each configured from a plurality of laminated battery cells (for example, the battery cell 60 described later); a retaining mechanism (for example, the retaining mechanism 7 described later) which is disposed between the plurality of battery cell groups, and respectively retains the plurality of battery cell groups within the outer packaging, by applying pressure against the plurality of battery cell groups in a direction separating the battery cell groups and pressing towards the two outer side walls which are opposing.

According to the battery device as described in the first aspect, it is possible to equip a plurality of battery cells in high density, and possible to easily collectively retain a plurality of battery cell groups in parallel, without needing to separately fix individual battery cells.

According to the second aspect of the present invention, in the battery device as described in the first aspect, the two outer side walls may respectively have a temperature-adjusting medium channel (for example, the temperature-adjusting medium channel 36 described later) in which a temperature-adjusting medium capable of exchanging heat with the battery cells via the outer side walls flows.

According to the battery device as described in the second aspect, heat exchange with the temperature-adjusting medium within the temperature-adjusting medium channel becomes possible via the outer side wall, and thus more efficient heat exchange becomes possible.

According to a third aspect of the present invention, in the battery device as described in the second aspect, the first temperature-adjusting medium channel may be provided inside of the outer side wall.

According to the battery device as described in the third aspect, it is unnecessary to perform processing of grooves, etc. for constructing a temperature-adjusting medium channel in the outer packaging later. In addition, since it is possible to configure the outer packaging compactly, a size reduction of the battery device is possible.

According to a fourth aspect of the present invention, in the battery device as described in any one of the first to third aspects, the outer packaging may be an extrusion molded article with a direction following a lamination direction of the battery cells as an extrusion direction.

According to the battery device as described in the fourth aspect, it is possible to easily mold the outer packaging. In addition, since the outer packaging has not joint part between plate members, there is no risk of assembly variation or thermal distortion occurring, and there is no risk of distortion of the joint part occurring due to pressing pressure by the retaining mechanism.

According to a fifth aspect of the present invention, in the battery device as described in any one of the first to fourth aspects, the retaining mechanism may be configured from a resin (for example, the resin 710 described later) which can expand by chemical reaction, or a resin which can fill into the outer packaging at a predetermined filling pressure, and may apply pressure against the plurality of battery cell groups in a direction separating the battery cell groups and pressing towards the two outer side wall which are opposing, by expansion pressure or filling pressure of the resin.

According to the battery device as described in the fifth aspect, since it is possible to apply pressure in a pressing direction according to individual battery cells of the battery cell group, by way of the expansion pressure or filling pressure of resin, variation in the dimensions of individual battery cells can be permitted. In addition, since the space for constructing the retaining mechanism is sufficient with an extremely small space capable of filling the resin, it is possible to further reduce the size of the outer packaging. Moreover, it is possible to simultaneously impart an insulating function to the retaining mechanism.

According to a sixth aspect of the present invention, the battery device as described in the fifth aspect may include, at a site adjacent to the resin retaining the battery cell group within the outer packaging, an escape space (for example, the escape space 302 described later) which permits infiltration of the resin upon deforming by way of load input to the resin.

According to the battery device as described in the sixth aspect, the resin deformed during load input such as impact load can infiltrate into the escape space without attacking the battery cells. For this reason, it is possible to reduce the influence on the battery cell during load input, and possible to suppress deformation, etc. of the battery cells.

According to a seventh aspect of the present invention, in the battery device as described in any one of the first to fourth aspects, the retaining mechanism may be configured by a leaf spring (for example, the leaf spring 720 described later) of shape memory alloy, and the leaf spring may apply pressure against the plurality of battery cell groups in a direction separating the battery cell groups and pressing towards the two outer side walls which are opposing, by way of spring counterforce.

According to the battery device as described in the seventh aspect, after compressing the leaf spring of shape memory alloy in a low temperature state, and inserting into the outer packaging in this compressed state, it is possible to cause spring counterforce to generate by restoring to the original shape accompanying temperature rise. Therefore, since the space for constructing the retaining mechanism is sufficient with an extremely small space capable of inserting the leaf spring in the compressed state, it is possible to further reduce the size of the battery device.

According to an eighth aspect of the present invention, in the battery device as described in any one of the first to fourth aspects, the retaining mechanism may be configured by a coil (for example, the coil 730 described later) having elasticity disposed so that an axial direction thereof follows a lamination direction of the battery cells, and the coil may apply pressure against the plurality of battery cell groups in a direction separating the battery cell groups and pressing towards the two outer side walls which are opposing, by way of being elastically expanded in diameter.

According to the battery device as described in the eighth aspect, it is possible to easily cope with dimensional variation of individual battery cells by changing the extent of diameter expansion at every pitch of the coil, and thus possible to easily apply pressure in the pressing direction on individual battery cells. In addition, it is possible to use the space in the center of the coil as an accommodating or inserting space of the constituent components of the battery device such as wires, and thus possible to effectively use the space within the battery device.

According to a ninth aspect of the present invention, in the battery device as described in the eighth aspect, it is preferable for the coil to be expanded in diameter by being rotationally displaced in an opposite direction to a winding direction.

According to the battery device as described in the ninth aspect, it is possible to easily expand in the diameter by simply rotationally displacing the coil, and thus apply pressure in a pressing direction against individual battery cells.

According to a tenth aspect of the present invention, in the battery device as described in the eighth or ninth aspect, it is preferable for the coil to consist of hollow wire having a heat transfer property, and inside of the hollow wire to configure a second temperature-adjusting medium channel (for example, the temperature-adjusting medium channel 731 described later).

According to the battery device as described in the tenth aspect, since the coil jointly perform a temperature regulation function simultaneously with the pressing and retaining function of the battery cell group, it is possible to raise the heat exchange efficiency.

According to an eleventh aspect of the present invention, in the battery device as described in any one of the first to fourth aspects, the retaining mechanism may be configured by a cam member (for example, the cam member 740 described later) consisting of a rigid body having a cross-sectional shape in which a radius continuously changes from a center of rotation relative to a rotation direction, and the cam member may apply a pressure against the plurality of battery cell groups in a direction separating the battery cell groups and pressing towards the two outer side walls which are opposing, by being disposed at a rotational displacement position at which the radius increases along the pressing direction of the battery cell group.

According to the battery device as described in the eleventh aspect, it is possible to constantly maintain the pressing pressure of the battery cell group, by adjusting the rotational displacement amount of the cam member. In addition, since the cam member consists of a rigid body, even if the momentary G is generated on the battery cell group, it is possible to maintain the pressing pressure.

According to a twelfth aspect of the present invention, in the battery device as described in the eleventh aspect, it is preferable for at least one end part of the cam member to have a fixing member (for example, the fixing member 742 described later) which maintains the rotational displacement position of the cam member.

According to the battery device as described in the twelfth aspect, it is possible to easily maintain the rotational displacement amount of the cam member by the fixing member.

According to a thirteenth aspect of the present invention, in the battery device as described in any one of the first to fourth aspects, the retaining mechanism may be configured by a pressing member (for example, the pressing member 750 described later) capable of increasing width dimension in a pressing direction of the battery cell group by way of elastic deformation, and the pressing member may apply pressure against the plurality of battery cell groups in a direction separating the battery cell groups and pressing towards the two outer side walls which are opposing, by way of being plastically deformed.

According to the battery device as described in the thirteenth aspect, it is possible to easily equip the pressing member before plastic deformation within the outer packaging, and possible to easily apply stable pressing pressure against the battery cell group by causing the pressing member to plastically deform within the outer packaging using a crimping tool or the like.

According to a fourteenth aspect of the present invention, in the battery device as described in any one of the first to fourth aspects, the retaining mechanism may be configured by a link mechanism (for example, the link mechanism 760 described later) having two parallel support plates (for example, the support plate 761 described later) disposed along a lamination direction of the battery cells, and a plurality of parallel connecting members for example, the connecting member 762 described later) which are rotatably connected over the two support plates, the link mechanism being capable of expanding an interval between the support plates by the support plates relatively moving in opposite directions from each other along the lamination direction of the battery cells, and the link mechanism may apply pressure against the plurality of battery cell groups in a direction separating the battery cell groups and pressing towards the two outer side walls which are opposing, by way of expansion of the interval between the support plates.

According to the battery device as described in the fourteenth aspect, it is possible to easily equip the link mechanism prior to expanding the interval of support plates within the outer packaging, and possible to easily apply stable pressing pressure against the battery cell group by expanding the interval of support plates within the outer packaging.

According to a fifteenth aspect of the present invention, in the battery device as described in the fourteenth aspect, end plates (for example, the end plate 4 and side wall part 201 described later) may be respectively disposed at both ends in the lamination direction of the battery cells in the battery cell group, and the support plates of the link mechanism may be maintained in a state expanding the interval, by being sandwiched between the end plates.

According to the battery device as described in the fifteenth aspect, since it is possible to operate the link mechanism by simply clamping the battery cell group from both sides by end plates, it is possible to easily apply pressing pressure against the battery cell group.

According to a sixteenth aspect of the present invention, in the battery device as described in any one of the first to fourth aspects, the retaining mechanism may be configured from a wedge mechanism (for example, the wedge mechanism 770 described later) having a through hole (for example, the through hole 771 described later) which penetrates the outer packaging, and a wedge member (for example, the wedge member 772 described later) having a sloped surface (for example, the sloped surface 772b described later) at a leading end, and the sloped surface of the wedge member inserted in the through hole may apply pressure against the plurality of battery cell groups in a direction separating the battery cell groups and pressing towards the two outer side walls which are opposing, by way of contacting with the battery cell group.

According to the battery device as described in the sixteenth aspect, it is possible to easily apply pressing pressure against the battery cell group within the outer packaging, by inserting the wedge member into the through hole from outside of the outer packaging.

According to a seventeenth aspect of the present invention, in the battery device as described in any one of the first to fourth aspects, the retaining mechanism may be configured by a filling member (for example, the filling member 780 described later) having a gas filled layer (for example, the gas filled layer 781 described later) in which a gas is filled, and a resin filled layer (for example, the resin filled layer 782 described later) disposed at an outer circumference of the gas filled layer, and in which curable resin is filled, and the filling member may apply pressure against the battery cell group in a direction separating the battery cell groups and pressing towards the two outer side walls which are opposing, by the curable resin filled into the resin filled layer curing in a state pushing the battery cell group by way of pressure of the gas filled into the gas filled layer.

According to the battery device as described in the seventeenth aspect, it is possible to apply pressure in the pressing direction against the battery cell group within the outer packaging without waiting for curing of the curable resin within the resin filled layer, by filling a gas into the gas filled layer of the filling member, and it is possible to maintain this pressing pressure by curing the curable resin within the resin filled layer thereafter; therefore, it is possible to easily apply a stable pressing pressure against the batter cell group within the outer packaging.

According to the eighteenth aspect, in the battery device as described in the seventeenth aspect, the filling member may have, at a terminal part (for example, the terminal part 784 described later), a joint part (for example, the first joint part 785 described later) for filling the gas into the gas filled layer, and a joint part (for example, the second joint part 786 described later) for filling the curable resin into the resin filled layer.

According to the battery device as described in the eighteenth aspect, since it is possible to perform filling of gas or curable resin into the filling member from an end side of the battery cell group along the lamination direction of battery cells, it is superior in workability.

According to a nineteenth aspect of the present invention, in the battery device as described in the eighteenth aspect, the joint part may be a female joint part.

According to the battery device as described in the nineteenth aspect, the projection amount of the joint part from the terminal part of the filling member is suppressed, and it is possible to reduce the size of the terminal part.

According to a twentieth aspect of the present invention, in the battery device as described in any one of the seventeenth to nineteenth aspects, the resin filled layer may have a path part (for example, the path part 782a described later) traversing the gas filled layer along the pressing direct of the battery cell group.

According to the battery device as described in the twentieth aspect, it is possible to raise the strength of the filling member in the pressing direction of the battery cell group.

A method for manufacturing a battery device (for example, the battery device 1 described later) according to a twenty-first aspect of the present invention includes: disposing in parallel a plurality of battery cell groups (battery cell group 6) configured by a plurality of laminated battery cells (for example, the battery cells 60 described later) respectively between two outer side walls (for example, the outer side wall 33 described later) of an outer packaging (for example, the outer packaging 30 described later) having the two outer side walls; and then retaining within the outer packaging the plurality of battery cell groups in a state pressed towards the two outer side walls, by applying pressure against the plurality of battery cell groups in a direction separating the battery cell groups and pressing towards the two outer side walls which are opposing.

According to the battery device as described in the twenty-first aspect, it is possible to easily obtain a battery device which can equip a plurality of battery cells in high density, and capable of easily collectively retaining a plurality of battery cell groups in parallel, without needing to separately fix individual battery cells.

Effects of the Invention

According to the present invention, it is possible to provide a battery device, as well as a method for manufacturing battery devices, which can equip a plurality of battery cells in high density, and capable of easily collectively retaining a plurality of battery cell groups in parallel, without needing to separately fix individual battery cells.

BRIEF DESCRIPTION OF THE DRAWINGS

FIG. 13 is a perspective view showing a coil according to another embodiment of the retaining mechanism;

FIG. 15A is a schematic diagram viewing, from a lamination direction of battery cells, a relationship of a coil in a state generating pressing pressure against a battery cell group, with a battery cell group and outer side wall;

FIG. 20 is a schematic diagram showing a state in which a pressing member according to another embodiment of the retaining mechanism is not generating pressing pressure;

FIG. 21A is a schematic diagram showing an example of a method of plastically deforming the pressing member shown in FIG. 20;

FIG. 21B is a schematic diagram showing a state in which the pressing member shown in FIG. 20 is generating a pressing pressure;

FIG. 22B is a schematic diagram showing a state in which the link mechanism shown in FIG. 22A is generating a pressing pressure;

PREFERRED MODE FOR CARRYING OUT THE INVENTION

Hereinafter, an example of an embodiment of the present invention will be explained in detail by referencing the drawings.

(Overall Configuration of Battery Device)

Figure 1:
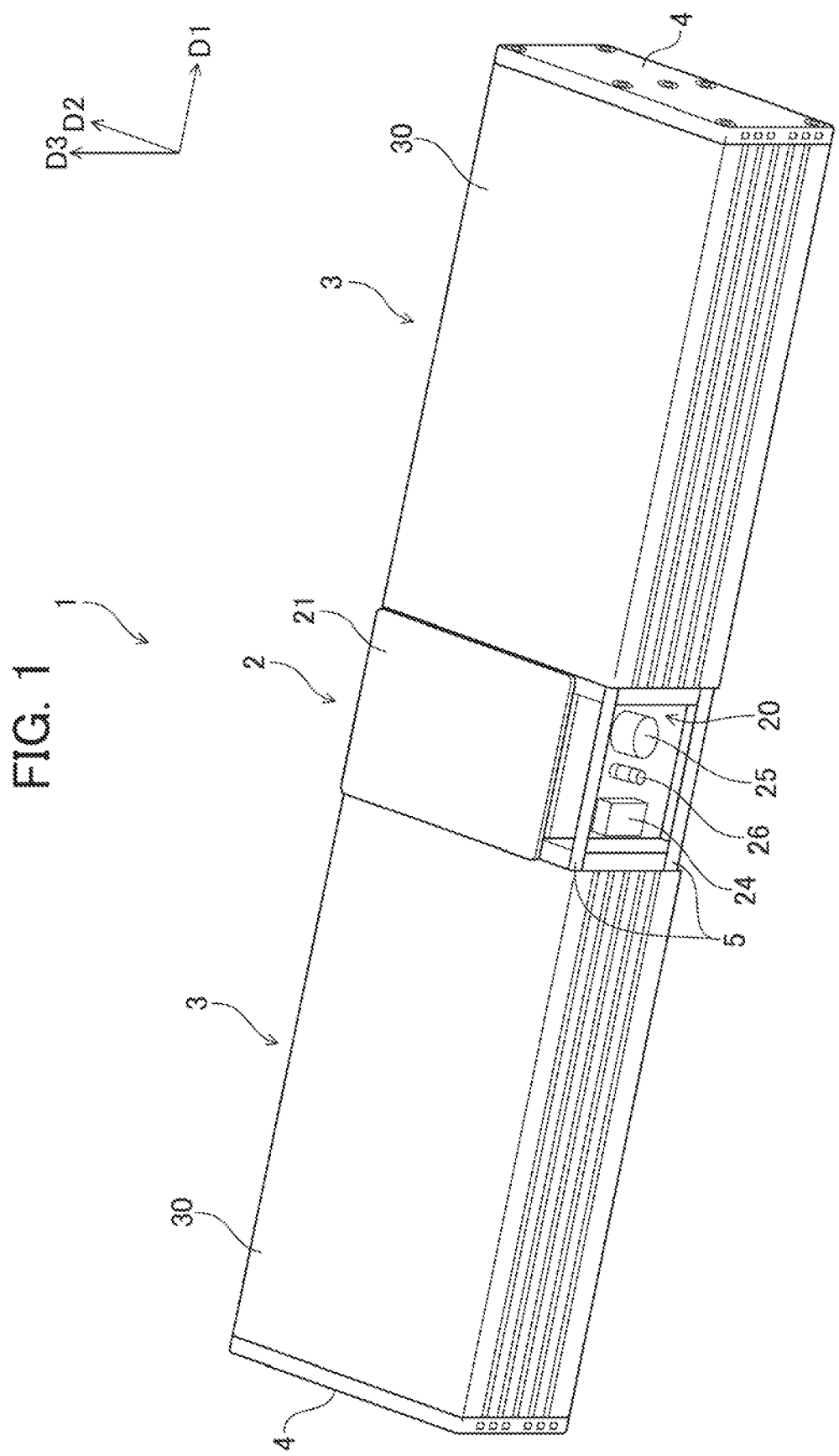
FIG. 1 is a perspective view showing an embodiment of a battery device according to the present invention.
Figure 2:
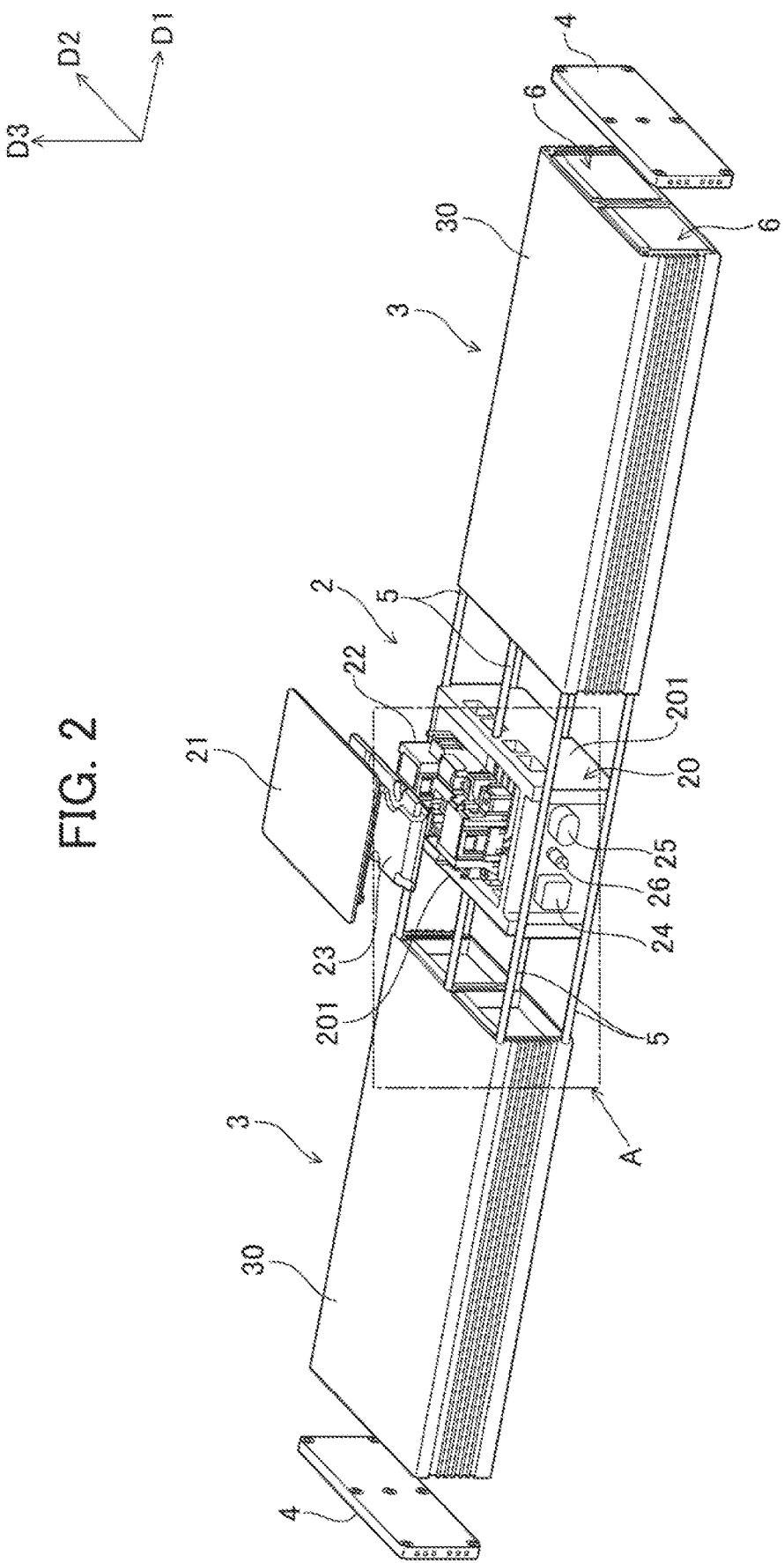
FIG. 2 is an exploded perspective view of the battery device shown in FIG. 1.

A battery device 1 shown in the present embodiment includes one I/F (interface) box 2, and two battery cell mounting parts 3, 3, as shown in FIGS. 1 and 2. It should be noted that a direction following the D1 direction indicates the length direction of the battery device 1, in the direction shown by the arrow in each drawing of the present disclosure. The direction following the D2 direction indicates the width direction of the battery device 1. The direction following the D3 direction indicates the height direction of the battery device 1. The D3 direction indicates "up" of the battery device 1, and the opposite direction indicates "down" of the battery device 1.

In the battery device 1, an I/F box 2 is arranged at a central part, and battery mounting parts 3, 3 are respectively arranged at both ends along the D1 direction of this I/F box 2. The battery mounting parts 3, 3 include battery cell groups 6, respectively. The battery cell group 6 of the battery mounting part 3 will be described later in detail; however, it makes contact in a heat exchangeable manner with a heat exchange surface by way of the retaining mechanism 7, and a contact state thereof is retained and positioned.

End plates 4, 4 are respectively arranged at the end surface on a side farther from the I/O box 2 of each battery cell mounting parts 3, 3. The two battery cell mounting parts 3, 3 are coupled by a plurality of (six in the present embodiment) elongated coupling bolts 5 inserted to span between battery cell mounting parts 3, 3 through the I/F box 2. The end plates 4, 4 shown in the present embodiment clamp the two battery cell mounting parts 3, 3 by the clamping force from the coupling bolts 5 in a mutually approaching direction to sandwich the I/F box 2 from both sides. It should be noted that the coupling method between the battery cell mounting part 3 and I/F box 2 is not limited to a method adopting coupling bolts 5, and may adopt welding or another appropriate known connecting method.
(I/F Box)

Figure 3:
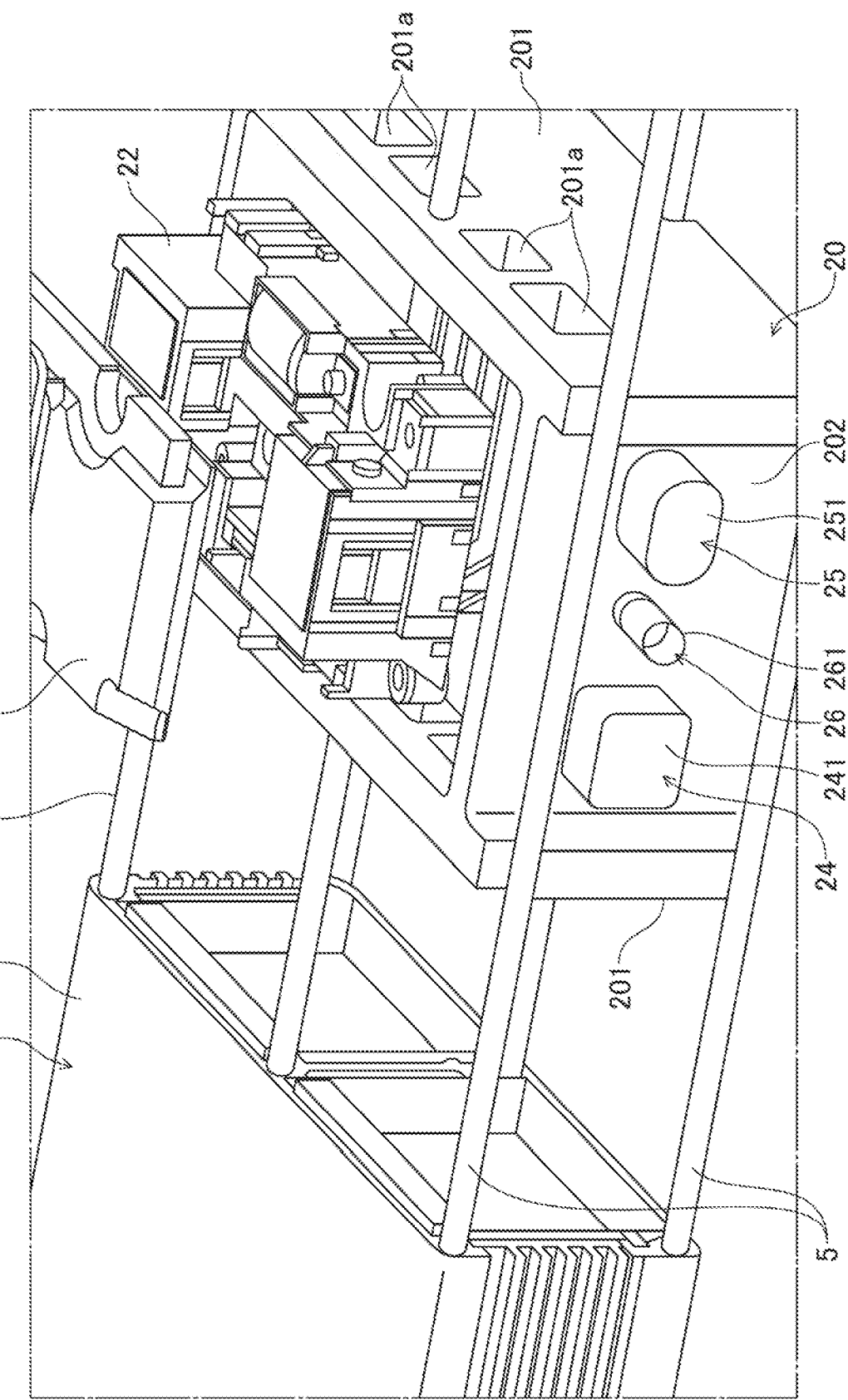
FIG. 3 is an enlarged view of the region A shown in the rectangular frame of FIG. 2.

The I/F box 2 accommodates components 22 such as a supply channel component of temperature-adjusting medium to the battery cell mounting parts 3, 3, a distribution component and an ECU (engine control unit). More specifically, as shown in FIGS. 2 and 3, the I/F box 2 has a box main body 20 and a lid 21 which covers the top side of the box main body 20, and accommodates the components 22 inside of the box main body 20. The components 22 are protected by a cover 23 inside of the box main body 20.

The box main body 20 is a container consisting of a rigid body of aluminum, aluminum alloy or the like, and is formed in a rectangular shape in a plan view. Two parallel side wall parts 201, 201 of the box main body 20 facing the D1 direction are respectively arranged at sides connected with the battery cell mounting parts 3, 3. In the battery device 1 shown in the present embodiment, the side wall parts 201, 201 function also as one more end plate for sandwiching and fastening the battery cell groups 6, 6 described later which are accommodated in the battery cell mounting parts 3, 3 from both sides together with the end plates 4, 4. For this reason, the side wall parts 201, 201 have sufficient thickness which can withstand a large fastening load. In the side wall parts 201, 201, a plurality of wiring insertion holes 201a is provided through which wiring (not shown) extending from the battery cell groups 6, 6 inside the battery cell mounting parts 3, 3, respectively, are inserted in order to electrically connect with a power distribution part of the constituent components 22.

Figure 4:
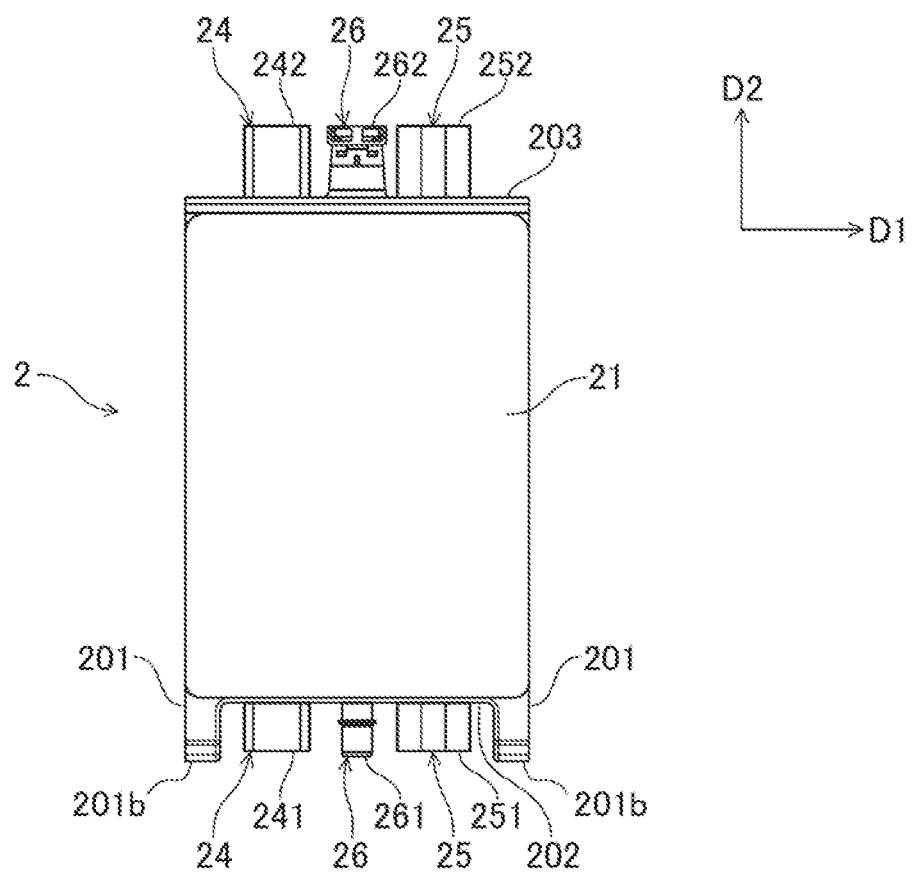
FIG. 4 is a plan view showing only an I/F box of the battery device.

As shown in FIG. 4, in the two side wall parts 202, 203 of the box main body 20 facing the direction along the D2 direction, a low voltage connector 24, a high-voltage connector 25, a temperature-adjusting medium supply connector 26 are respectively projected side by side in a straight line along the D1 direction, respectively. The low-voltage connector 24 and high-voltage connector 25 electrically connect to the power distribution part of the constituent components 22. The temperature-adjusting medium supply connector 26 communicates with each of the heat control medium flow channels 36 described later of the battery cell mounting parts 3, 3. The temperature-adjusting medium supply connector 26 is arranged between the low-voltage connector 24 and high-voltage connector 25.

The low-voltage connector 24 arranged at one side wall part 202 of the two side wall parts 202, 203 is a male connector 241, and the low-voltage connector 24 arranged on the other side wall part 203 is a female connector 242. In addition, similarly, the high-voltage connector 25 arranged on the one side wall part 202 is a male connector 251, and the high-voltage connector 25 arranged on the other side wall part 203 is a female connector 252. Furthermore, similarly, the temperature-adjusting medium supply connector 26 arranged on one side wall part 202 is a male connector 261, and the temperature-adjusting medium supply connector 26 arranged on the other side wall part 203 is a female connector 262.

Figure 5:
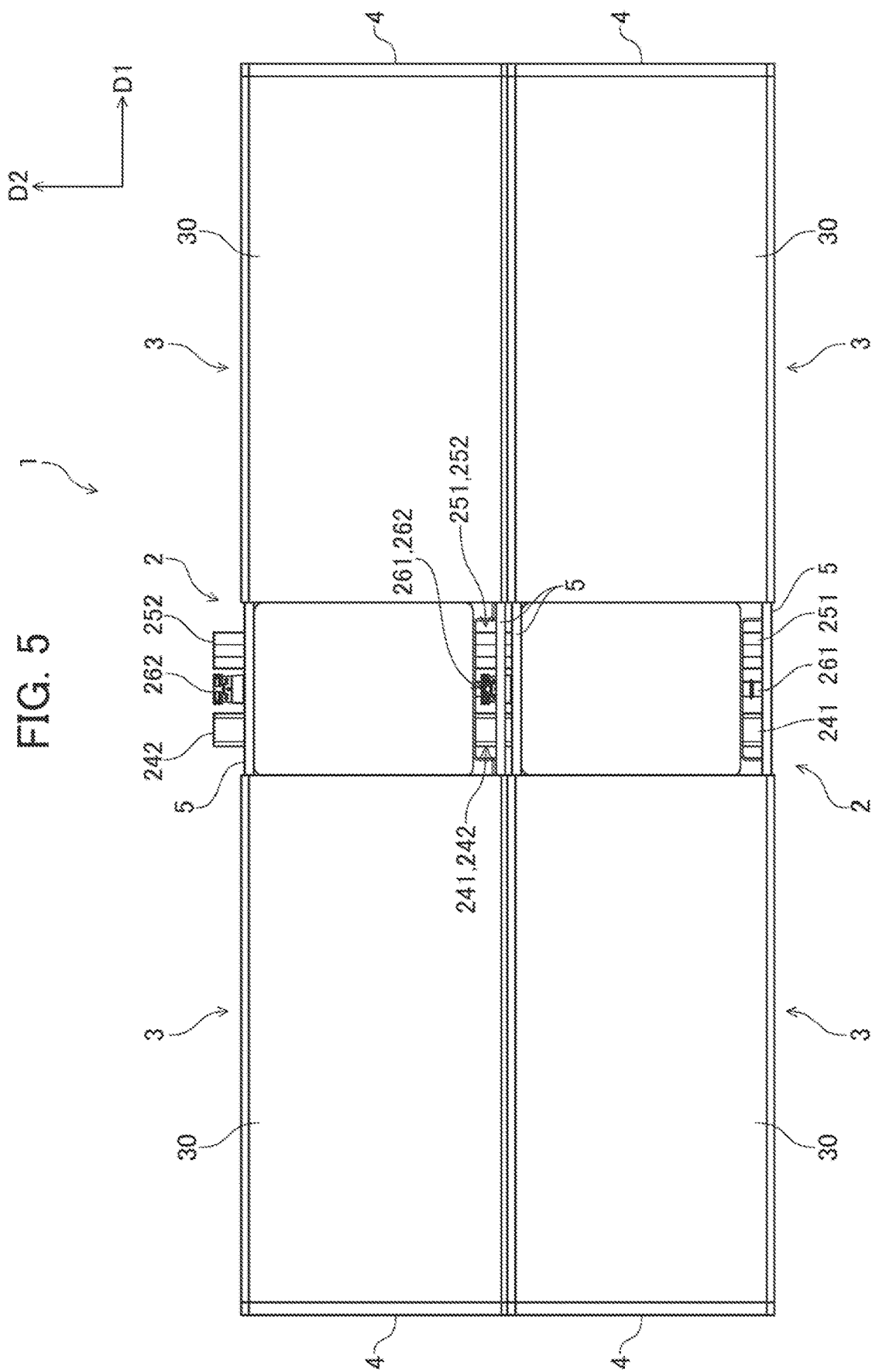
FIG. 5 is a plan view showing a state connecting two battery devices.

These male connectors 241, 251, 261 and the female connectors 242, 252, 262 have complimentary connectable structures. The low-voltage connector 24, 24, high-voltage connectors 25, 25 and temperature-adjusting medium supply connectors 26, 26 of both side wall parts 202, 203 are respectively arranged on the same straight line along the D2 direction. For this reason, as shown in FIG. 5, the battery device 1 is able to connect along the D2 direction, by respectively linking the low-voltage connector 24, 24, high-voltage connectors 25, 25 and temperature-adjusting medium supply connectors 26, 26, with another battery device 1 having the same structure. By the respective connectors 24, 25, 26 being connected, the battery devices 1, 1 are electrically connected, and mutual circulation of temperature-adjusting medium via the temperature-adjusting medium supply connectors 26, 26 is possible. It is thereby possible to functionally integrate a plurality of the battery devices 1, 1. By increasing the number of connections of the battery device 1, a large capacity battery device is configurable simply.

In the box main body 20, the one side wall part 202 among the side wall parts 202, 203 is arranged at a position somewhat deeper to the inner side (side of side wall part 203) than the end parts (end part on lower side of FIG. 4) 201b, 201b of the two side wall parts 201, 201 connected with the battery cell mounting parts 3, 3. For this reason, upon coupling a plurality of battery devices 1, 1 the connection site of each connector 24, 25, 26 is accommodated between end parts 201b, 201b of two side wall parts 201, 201, and side wall parts 202, 203 of adjacent I/F boxes 2, 2. It is thereby possible to make the battery cell mounting parts 3, 3 which are adjacent in the coupling direction to be as close as possible or abut, and thus possible to reduce the load acting on the connection site.
(Battery Cell Mounting Part)

The two battery cell mounting parts 3, 3 are arranged on both sides sandwiching the I/F box 2. Due to the two battery cell mounting parts 3, 3 being the same structure, the configuration of one battery cell mounting part 3 will be explained herein using FIGS. 6 to 8. The battery cell mounting part 3 has an outer packaging 30, battery cell group 6 accommodated inside the outer packaging 30, and a retaining mechanism 7 which retains the battery cell group 6 inside of the outer packaging 30. The battery cell mounting part 3 shown in the present embodiment has two battery cell groups 6, 6, arranged in parallel inside of the outer packaging 30. The battery device 1 can thereby arrange the battery cells 60 described later in high density. However, there may be only one battery cell group 6 arranged inside one outer packaging 30.
(Outer Packaging)

Figure 8:
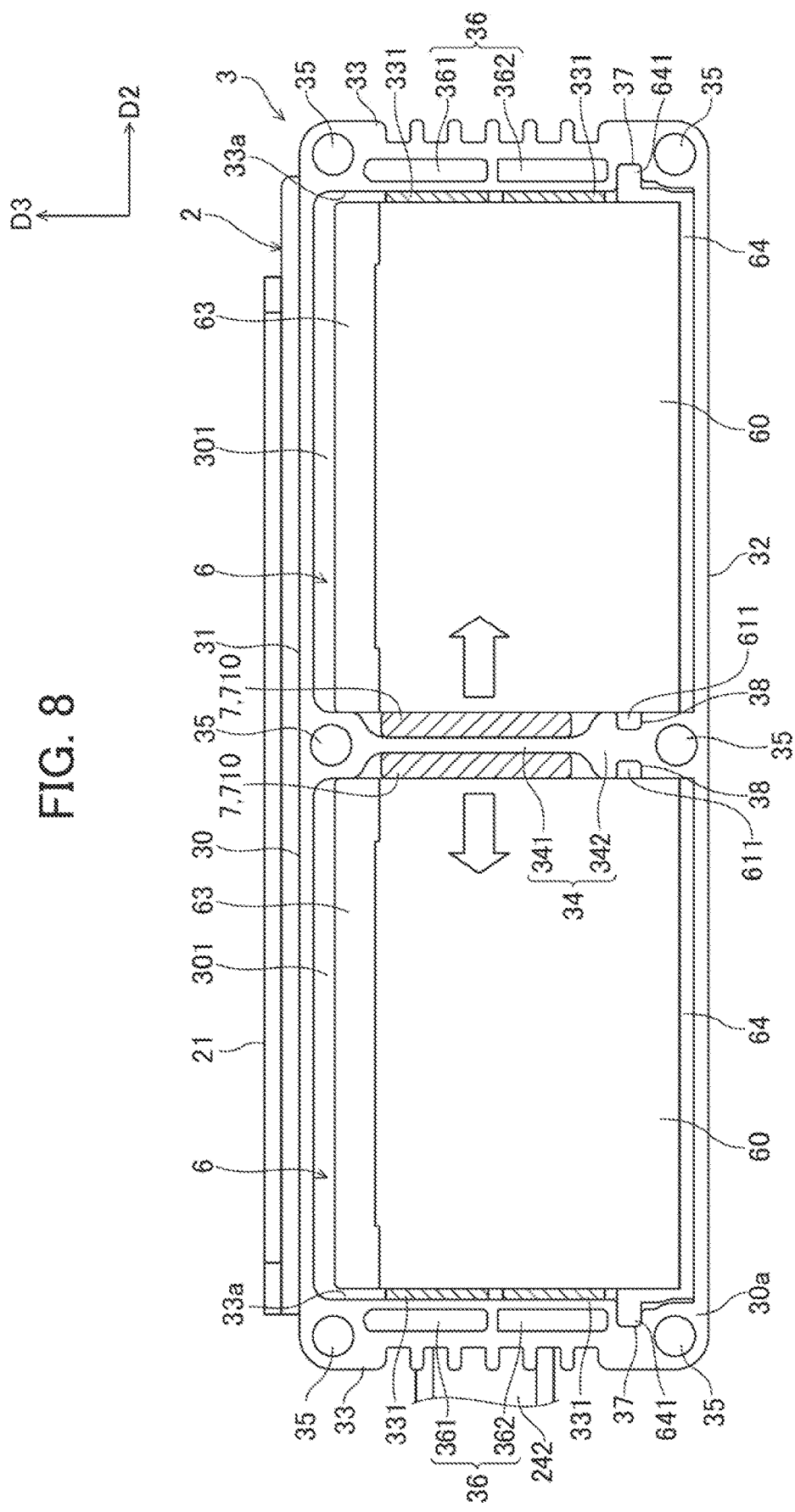
FIG. 8 is a view showing an outer packaging interior of the battery device showing an embodiment of a retaining mechanism.

The outer packaging 30 shown in the present embodiment is formed in a square tubular form by a rigid body of aluminum, aluminum alloy or the like. Both ends in the length direction of the outer packaging 30 (direction along D1 direction) are respectively opened in a horizontally long rectangular shape. This outer packaging 30 has an upper side wall 31, lower side wall 32, two outer side walls 33, 33, and an intermediate wall 34 arranged between the two outer side walls 33, 33. As shown in FIG. 8, the outer packaging 30 has an appropriate number of bolt insertion holes 35 through which connecting bolts 5 (not shown in FIG. 8) are inserted. The bolt insertion hole 35 penetrates the outer packaging 30 to extend in the length direction of the outer packaging 30.

To the two outer side walls 33, 33, temperature-adjusting medium flow paths (first temperature-adjusting medium flow paths) 36, 36 through which temperature-adjusting medium flows are respectively provided. An inner surface 33a of the outer side wall 33 configures a heat exchange surface with the temperature-adjusting medium inside of the temperature-adjusting medium flow path 36. The temperature-adjusting medium flow path 36 of each outer side wall 33 is demarcated into the two channels of an upper channel 361 arranged at the top, and a lower channel 362 arranged at the bottom. The upper channel 361 and lower channel 362 each open to both end surfaces 30a, 30a of the outer packaging 30 by extending along the entire length in the length direction (D1 direction) of the outer packaging 30. The end on the I/F box 2 side of the temperature-adjusting medium flow path 36, although not illustrated, communicates with the temperature-adjusting medium supply connector 26 via side wall part 201 of the I/F box 2 and the interior of the I/F box 2.

As the temperature-adjusting medium, cooling air or cooling liquid for cooling the battery cell described later which constitutes the battery cell group 6 is generally used; however, it is also possible to use air or liquid which was heated to a predetermined temperature in order to heat the battery cell as necessary. In addition, the temperature-adjusting medium flow path 36 is entirely embedded inside of the outer side wall 33; however, the temperature-adjusting medium flow path 36 may be configured by a groove recessed from the outer side of the outer side wall 33, for example. In this case, by making a lid on the groove from the outer side of the outer side wall 33 way by way of a plate or the like, a channel through which the temperature-adjusting medium can flow is configured inside of the outer side wall 33. The temperature-adjusting medium flow path 36 may be configured by a pipe having a heat transfer property. In this case, the outer side wall 33 having the temperature-adjusting medium flow path 36 is configured by embedding or adhering this pipe to the outer side wall 33 in a heat exchangeable manner.

The intermediate wall 34 divides into two the interior of the outer packaging 30 in the D2 direction. The intermediate wall 34 has a thin wall part 341 formed in a thin wall shape from the central part in the height direction of the battery cell group 6 to the connection site with the upper side wall 31; and a thick wall part 342 formed in a thick wall form from the lower end of this thin wall part 341 to the connection site with the lower side wall 32. Two spaces within the outer packaging 30 demarcated by the intermediate wall 34 configures the battery cell group accommodating parts 301, 301. Each battery cell group 6, 6, is accommodated one by one in the respective battery cell group accommodating parts 301, 301. Two battery cell groups 6, 6 are thereby arranged in parallel in the outer packaging 30. However, the intermediate wall 34 is not essential in the outer packaging 30, and can be provided as necessary.

A recess 37 which can engage with a convex part 641 described later which projects from one side surface on the lower part of the battery cell group 6 is provided at the inner surface 33a of the outer side wall 33 of the outer packaging 30. Recesses 38 which can engage with a convex part 611 described later which projects from the other side surface of the lower part of the battery cell group are respectively provided on both surfaces of the thick wall part 342 of the interior wall 34 of the outer packaging 30. The recesses 37, 38 shown in the present embodiment are recessed from the inner surface 33a of the outer side wall 33, and extend along the length direction of the outer packaging 30. Both end parts of the recesses 37, 38 open to both end surfaces 30a, 30a of the outer packaging 30. The recess 37 is arranged lower than the temperature-adjusting medium flow path 36 of the interior of the outer side wall 33, and does not interfere with the temperature-adjusting medium flow path 36.

The outer packaging 30 of cylindrical shape shown in the present embodiment can be configured by an extrusion molded article which was extrusion molded along the D1 direction, by forming the bolt insertion hole 35, temperature-adjusting medium flow path 36, recesses 37, 38 and battery cell group accommodating part 301 in the same forms along the D1 direction. It is thereby possible to easily form the outer packaging 30. The outer packaging 30 of cylindrical shape consisting of an extrusion molded article does not have a joint at which joining plates, and thus variation or thermal distortion upon assembly caused by the joint will not occur. Moreover, the stress upon the battery cell group 6 being pressed towards the outer side wall 33 by the retaining mechanism 7 described later will not converge to cause distortion. For this reason, it is possible to configure the battery device 1 having the outer packaging 30 with stabilized form.

(Battery Cell Group)

Figure 6:
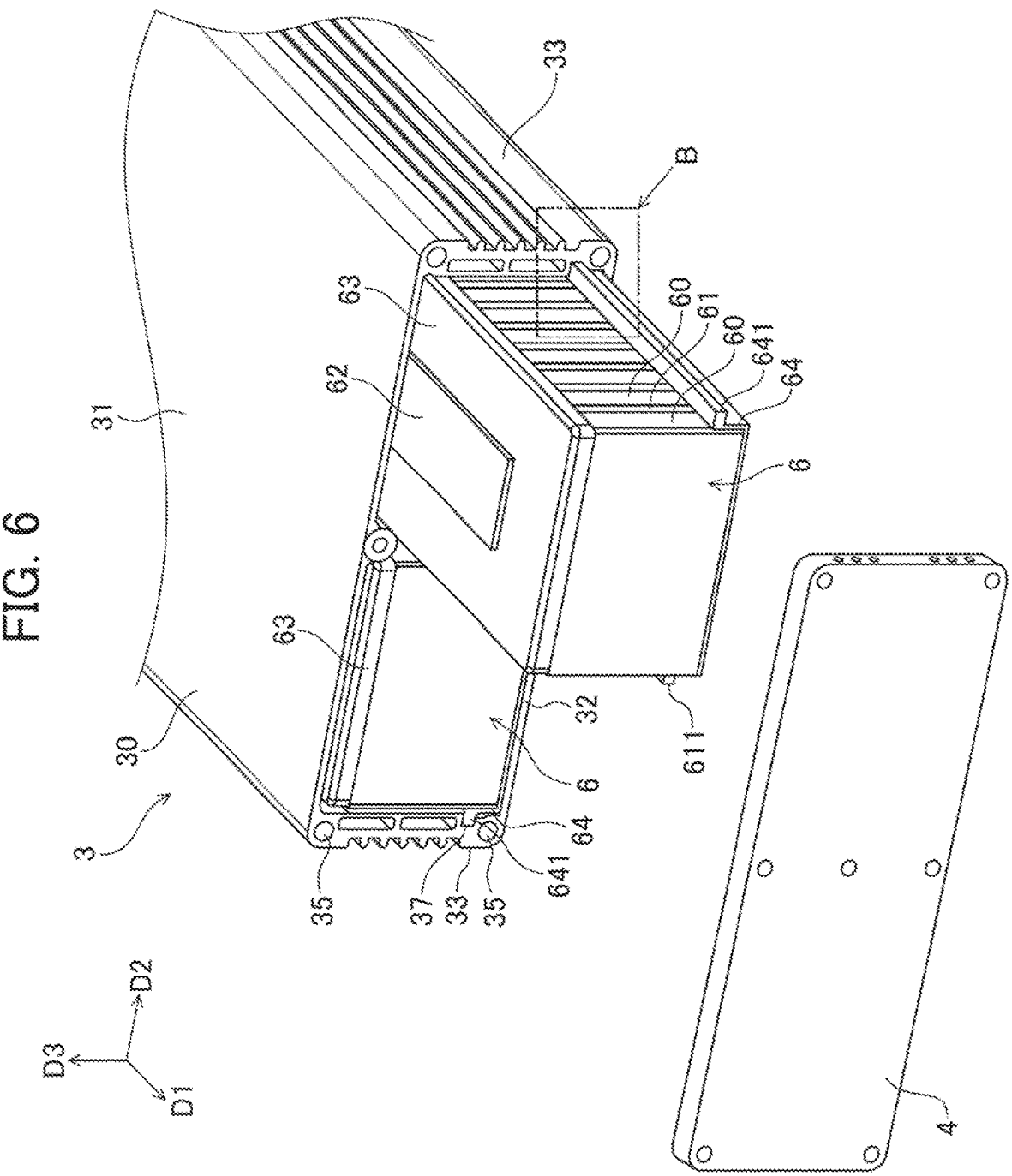
FIG. 6 is a principal enlarged perspective view showing an aspect of accommodating a battery cell group in a packaging of the battery device.
Figure 7:
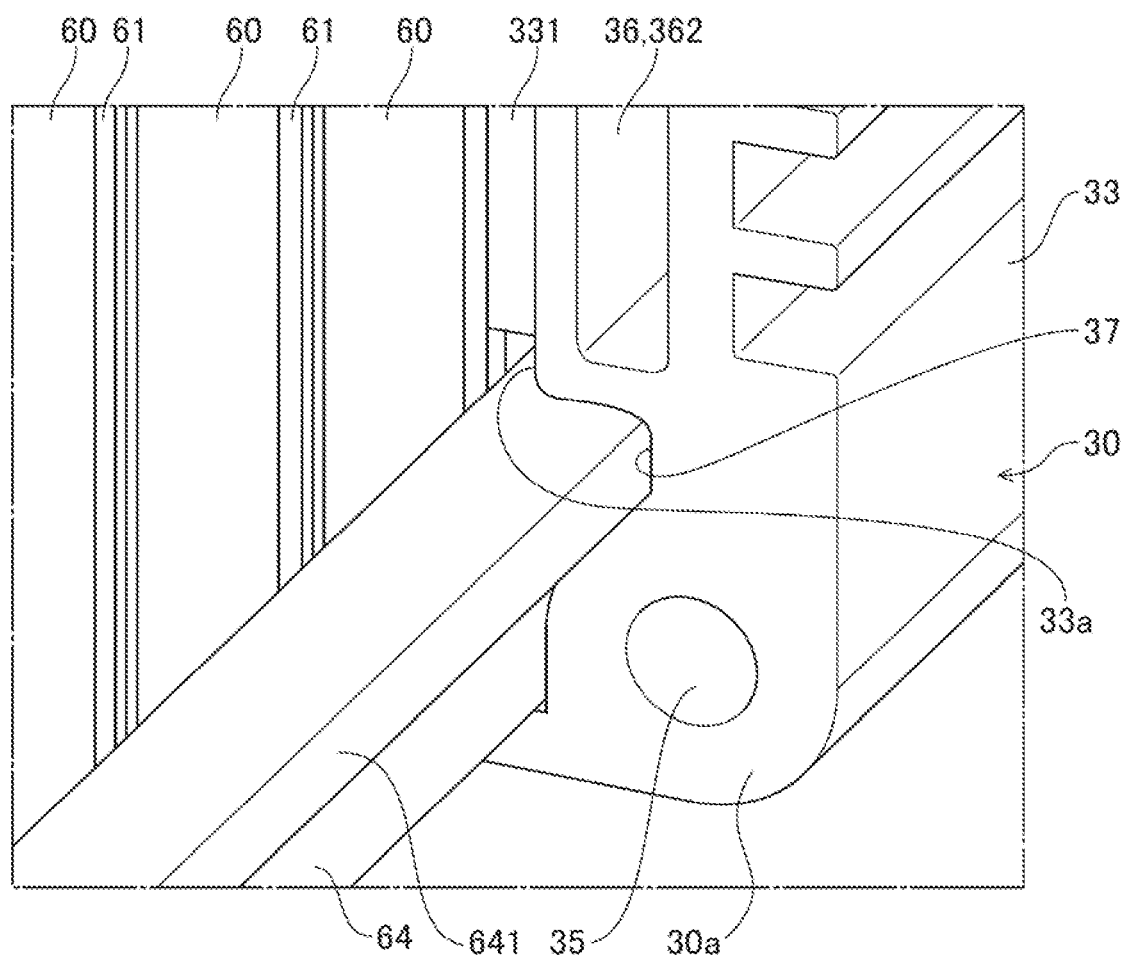
FIG. 7 is an enlarged view of a region B shown by the rectangular frame in FIG. 6.

The battery cell group 6 is configured by laminating along the D1 direction a plurality of battery cells 60 of cuboid shape consisting of a lithium ion secondary battery, for example, as shown in FIGS. 6 and 7. Between the battery cells 60, 60 adjoining in the lamination direction, a flat plate-like insulative separators 61 are respectively arranged, and pinched by adjoining battery cells 60, 60. The battery cell 60 is configured by accommodating an electrode body within a cell case consisting of aluminum, aluminum alloy or the like, and has a pair of positive/negative electrode terminals (not illustrated) on the upper surface. The electrode terminals of two battery cells 60, 60 adjoining in the lamination direction are electrically connected. All battery cells 60 of the battery cell group 6 are thereby electrically connected in series or parallel.

On the upper surface of the battery cell group 6, a status detection unit 62 for detecting the battery status such as a CVS (Cell Voltage Sensor) that performs voltage detection of the battery cell 60 is arranged. At the circumference of the status detection unit 62, a cover 63 spanning all battery cells 60 of the battery cell group 6 is arranged to protect the electrode terminals, etc. arranged on the upper surface.

An insulative sheet 64 is arranged at the lower surface of the battery cell group 6. The insulative sheet 64 extends along the entire length of the battery cell group 6 and insulates between the bottom surface of each battery cell 60 and the lower side wall 32 of the outer packaging 30. For the insulative sheet 64, the side end arranged on the side of the outer side wall 33 of the outer packaging 30 is slightly raised along the side wall of the battery cell group 6. The upper end of the insulative sheet 64 has a convex part 641 which juts out towards the outer side wall 33. The convex part 641 extends over the entire length of the battery cell group 6 and engages with the recess 37 provided in the inner surface 33a of the outer side wall 33.

The battery cell group 6, in a state placing the plurality of battery cells 60 laminated in high density on the upper surface of the insulative sheet 64, is inserted while sliding into the battery cell group accommodating part 301 from the side of one end surface 30a (end surface 30a on far side from I/F box 2) of the outer packaging 30. At this time, the battery cell group 6 can be smoothly inserted to the battery cell group accommodating part 301, while being guided by engagement between the convex part 641 and recess 37. Since the lamination state of each battery cell 60 during insertion is maintained, although not illustrated, each battery cell 60 of the battery cell group 6 may be integrated by simply being restrained by a restraining band or the like.

Each separator 61, as shown in FIGS. 6 and 8, has a convex part 611 slightly projecting towards the intermediate wall 34, at a side end surface arranged on the side of the intermediate wall 34 of the outer packaging 30. This convex part 611 is engaging with the recess 38 provided to the thick wall part 342 of the intermediate wall 34. For this reason, the battery cell group 6 comes to be so that smooth insertion to the battery cell group accommodating part 301 comes to be guided also by the engagement between this convex part 611 and recess 38. In addition, the battery cell group 6 accommodated inside of the outer packaging 30 is positioned in the vertical direction, by engagement between the recesses 37, 38 and convex parts 641, 611.

A heat transfer sheet 331 is arranged between the battery cell group 6 and the inner surface 33a of the outer side wall 33. The heat transfer sheet 331 may be formed in an elongated shape along the lamination direction of the battery cells 60, and may be divided into a plurality corresponding to each of the battery cells 60. In addition, the heat transfer sheet 331 prior to the battery cell group 6 being accommodated in the outer packaging 30 may be pasted in advance to the battery cell 60, and may be pasted in advance to the inner surface 33a of the outer side wall 33. The heat transfer sheet 331 adheres to both respective battery cells 60 and the inner surface 33a of the outer side wall 33, by the battery cell group 6 being pressed towards the outer side wall 33 by the retaining mechanism 7 described later. A contact state capable of heat exchange between each battery cell 60 and the inner surface 33a of the outer side wall 33 is thus stable, and more efficient heat exchange is possible.

The battery cell group 6 is configured by a plurality of groups of the battery cell 60 and separator 61 being laminated. The battery cell group 6 accommodated within the outer packaging 30 is tightened between the end plate 4 and side wall part 201 of the I/F box 2 by the coupling bolts 5. Expansion of the battery cell 60 is thereby suppressed. In the present embodiment, as shown in FIG. 6, a pair of the end plates 4 are used for two battery cell groups 6, 6 arranged in parallel within the outer packaging 30, and each battery cell 60 of two battery cell mounting parts 3, 3 arranged to sandwich the I/F box 2 is fastened integrally between the end plates 4, 4 by the coupling bolts 5.

The end plate 4 is formed by a rigid body of a metal such as aluminum or aluminum alloy, a resin such as engineering plastics, or a composite of these metals and resins. The end plate 4 may have inside a communication channel (not illustrated) which communicates with the temperature-adjusting medium flow path 36. For example, the communication channel is provided so as to communicate with the respective temperature-adjusting medium flow paths 36, 36 of the two outer side walls 33, 33. In addition, the communication channel, for example, may be provided so as to communicate between the upper side channel 361 and the lower side channel 362 of the temperature-adjusting medium flow path 36 of one outer side wall 33, at the surface contacting with the end surface 30a of the outer packaging 30. It is thereby possible to efficiently flow the temperature-adjusting medium within the outer packaging 30 using the end plates 4.

(Retaining Mechanism)

Next, the retaining mechanism 7 will be explained by referencing FIGS. 8 to 30. The retaining mechanism 7 is provided within the outer packaging 30 of each battery cell mounting parts 3, 3. The retaining mechanism 7 is arranged between the battery cell groups 6, 6 arranged in parallel within the outer packaging 30, and applies pressure against these respective battery cell groups in a direction separating the battery cell groups 6, 6 and pressing towards the two opposing outer side walls 33, 33. The retaining mechanism 7 causes all of the battery cells 60 of the battery cell group 6 to contact in a heat exchangeable manner via the heat transfer sheet 331 with the inner surface 33a of the outer side wall 33. At the same time as this, the retaining mechanism 7 maintains a state pressing each battery cell group 6, 6 towards the outer side walls 33, 33. All of the battery cells 60 of the battery cell group 6 are retained to be positioned without rattling within the outer packaging 30, in a state pressed towards the outer side wall 33 by the retaining mechanism 7.

The battery cell 60 pressed to the inner surface 33a of the outer side wall 33 by the retaining mechanism 7 is heat exchanged with the temperature-adjusting medium within the temperature-adjusting medium flow path 36 via the heat transfer sheet 331 and inner surface 33a of the outer side wall 33. For cooling of the battery cell 60, it is unnecessary to flow cooling air between adjoining battery cells 60, 60 as is conventionally. For this reason, it is possible to avoid a length increase in the lamination direction of the battery cells 60, whereby a size increase of the battery device 1 is avoided. In addition, the retaining mechanism 7 can collectively retain the entirety of the battery cell group 6, without requiring to retain the battery cells 60 one by one to the heat exchange surface as is conventionally. For this reason, the workability is good, and moreover easy, for contacting and retaining the battery cells 60 in a heat exchangeable manner to the heat exchange surface.

So long as the retaining mechanism 7 can arrange between the battery cell groups 6, 6 aligned within the outer packaging 30, and is able to apply pressure in a direction separating the battery cell groups 6, 6 and pressing towards two opposing outer side walls 33, 33, there are no particular restrictions. The retaining mechanism 7 shown in FIG. 8 is configured by resin 710. As the resin 710, it is possible to use resin which expands by chemical reaction can be used, for example. As a specific resin which expands by chemical reaction, a urethane resin which expands by chemical reaction of two liquids is exemplified. The resin 710 is filled along the lamination direction of the battery cell 60 in the gap between two battery cells groups 6, 6 arranged in parallel and both surfaces of the thin wall part 341 of the intermediate wall 34. When the resin 710 expands by chemical reaction after filling, the resin 710 applies pressure (expansion pressure) in a direction separating the battery cell groups 6, 6 and pressing towards the two outside walls 33, 33 against each battery cell group 6, 6 sandwiching the intermediate wall 34. The resin 710 maintains the expanded state thereof after expansion by chemical reaction; therefore, the battery cells 60 of each battery cell group 6, 6 contact in a heat exchangeable manner the inner surface 33a of the respective outer side walls 33 via the heat transfer sheet 331, whereby the contact state thereof is retained. For this reason, the battery cells 60 can efficiently carry out heat exchange with the temperature-adjusting medium inside of the temperature-adjusting medium flow path 36.

In addition, the resin 710 may apply the pressure (filling pressure) in a direction separating the battery cell groups 6, 6 and pressing towards the opposing outer side walls 33, 33, by the high-pressure filling pressure upon being filled into the outer packaging 30. The resin 710 after being filled at a predetermined filling pressure into the outer packaging 30 cures inside of the outer packaging 30 and maintains a predetermined hardness, and maintains the pressing pressure against the battery cell group 6. The battery cells 60 thereby contact in a heat exchangeable manner via the heat transfer sheet 331 with the inner surface 33a of each outer side wall 33, and the contact state thereof is retained. For this reason, the battery cell 60 can efficiently carry out heat exchange with the temperature-adjusting medium inside of the temperature-adjusting medium flow path 36. The resin 710 used in this case is not particularly limited, for example, and it may be configured from thermoplastic resin, thermosetting resin, elastomer, rubber, or combinations thereof.

The resin 710 can easily follow the unevenness of the side surfaces of the battery cell groups 6, 6 by the expansion pressure or filling pressure. For this reason, even if each battery cell 60 constituting the battery cell group 6 has width dimension variation, it is possible to tolerate this variation, and apply equal pressure to each battery cell 60. In addition, since the space filled with the resin 710 is sufficient with an extremely small space, it is possible to further reduce the size of the outer packaging 30. Furthermore, the resin 710 can also insulate between the battery cell group 6 and intermediate wall 34, or between the battery cell groups 6, 6 arranged in parallel.

Figure 9:
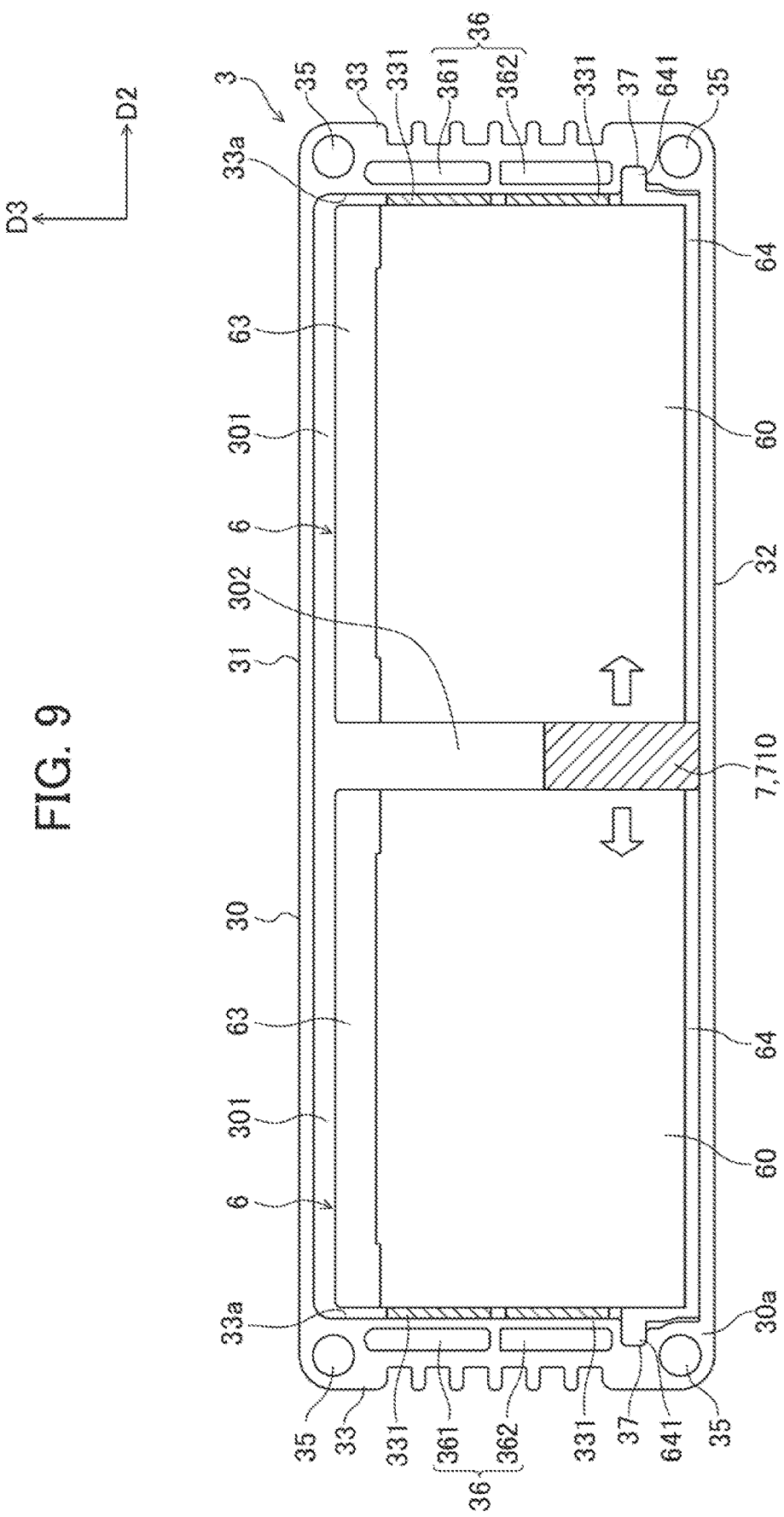
FIG. 9 is a view showing a packaging interior of the battery device showing another embodiment of a retaining mechanism.

FIG. 9 shows another embodiment of the outer packaging 30 having the retaining mechanism 7 configured from the resin 710. The intermediate wall 34 is not provided inside of this outer packaging 30. One resin 710 shared in the two battery cell groups 6, 6 is arranged between the battery cell groups 6, 6. One resin 710 causes pressure in a direction pressing towards the inner surface 33a of the opposing outer side wall 33 to apply against each of the two battery cell groups 6, 6. This resin 710 is arranged in close proximity to the lower side wall 32 of the outer packaging 30. In other words, the resin 710 is arranged to be biased downwards between the two battery cell groups 6, 6.

Figure 10:
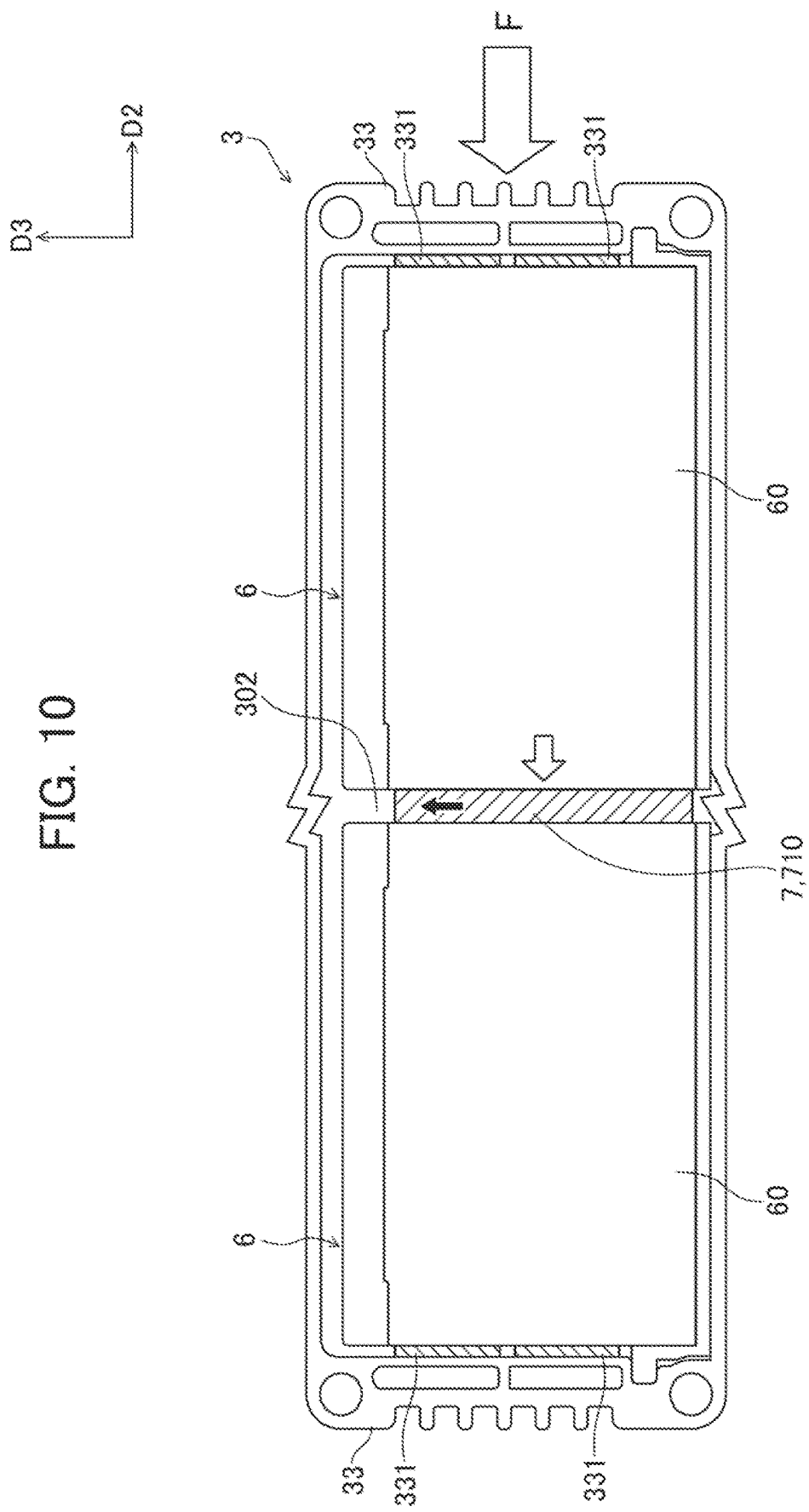
FIG. 10 is a view for explaining an aspect of collision load being inputted to the packaging shown in FIG. 9.

By the resin 710 being arranged to be biased downwards between the battery cell groups 6, 6, an escape space 302 in which the resin 710 is not present is formed at an upper part adjacent to the resin 710 between the battery cell groups 6, 6. This escape space 302 permits invasion of deformed resin 710. In other words, as shown in FIG. 10, by an impact load F by a lateral impact of the vehicle or the like, for example, being inputted laterally along the D2 direction against the outer packaging 30, if the outer packaging 30 ruptures or deforms due to being crushed along the D2 direction, the impact load F may act on the resin 710 via the battery cell group 6. At this time, the resin 710 is crushed to deform by the battery cell group 6, and it is possible to infiltrate inside of the upper escape space 302 without attacking the battery cells 60. The impact load F acting on the battery cell group 6 can reduce the influence imparted on the battery cell 60 upon input of an impact load F due to being buffered by deformation of the resin 710, and thus can suppress deformation, etc. of the battery cells 60.

In addition, the resin 710 shown in the present embodiment is arranged biased downwards of the battery cell group 6; therefore, even if the resin 710 deforms and penetrates to the escape space 302, it will not reach or hardly reach the electrode terminals arranged at the upper part of the battery cell 60. For this reason, it is possible to prevent or suppress the deformed resin 710 from interfering with the periphery of the electrode terminals.

Upon input of an impact force F, in order to configure so that the resin 710 can deform and effectively penetrate to the escape space 302 without attacking the battery cells 60, the withstanding load of the resin 710 itself is set when retaining the battery cell group 6 as shown in FIG. 9. More specifically, the withstanding load of the resin 710 itself when retaining the battery cell group 6 is set so as to be smaller than the withstanding load of the battery cell 60, and larger than the retaining load applied by the resin 710 on the battery cell group 6. Upon an impact load F larger than the withstanding load of the resin 710 itself being inputted, the resin 710 crushed by the battery cell group 6 easily deforms, and can penetrate to the escape space 302 without attacking the battery cell 60.

It should be noted that the resin 710 arranged to one side, for example, can be provided by filling the resin 710 between the battery cell groups 6, 6, after inserting a tool for configuring so that the resin 710 is not filled at a part to become the escape space 302 between the battery cell groups 6, 6. The resin 710 may be a resin which retains the battery cell group 6 by expansion, or may be a resin which retains the battery cell group 6 by filling pressure. The tool is removed after the resin 710 retains the battery cell group 6.

Figure 11:
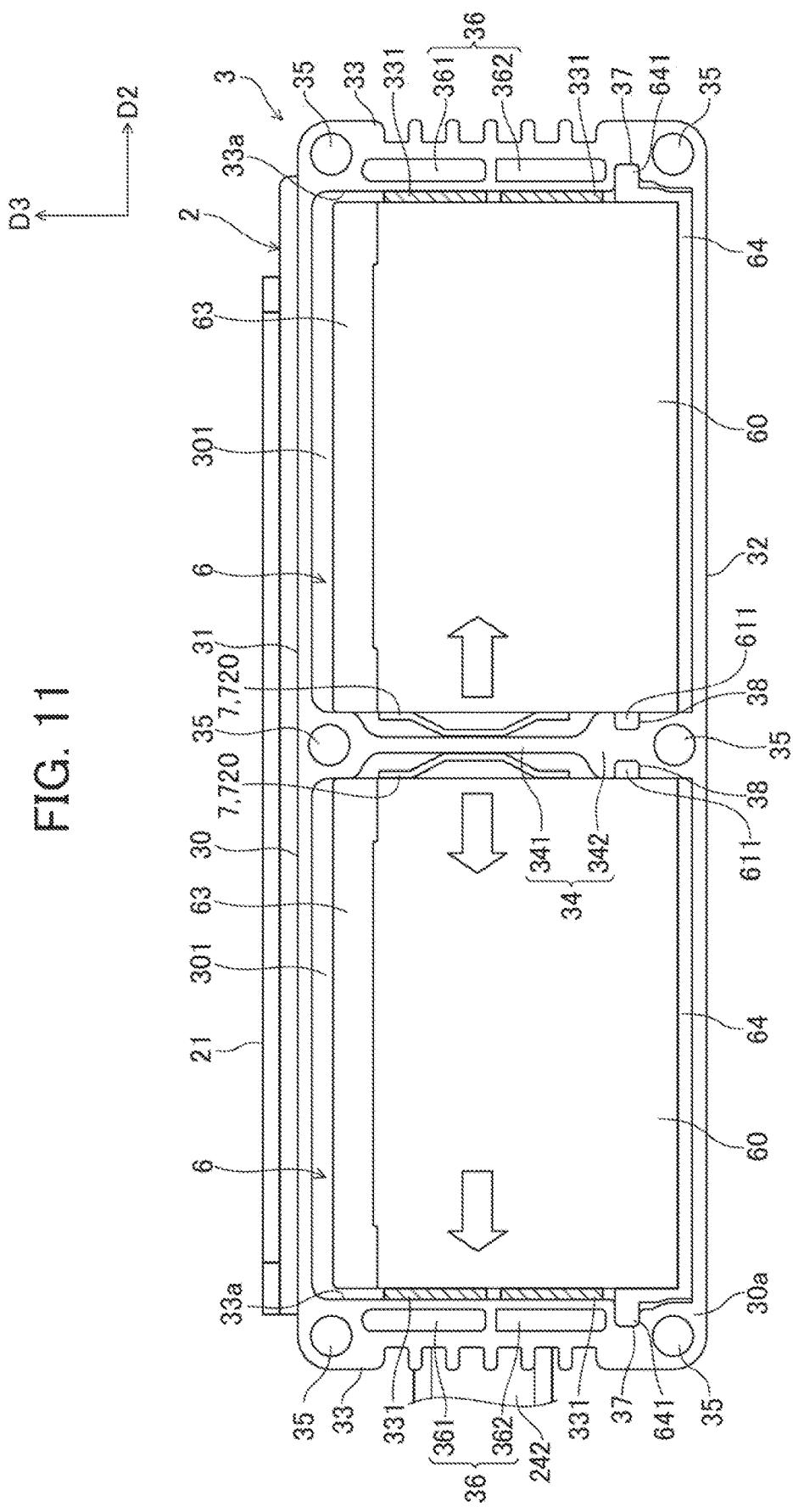
FIG. 11 is a view showing a packaging interior of the battery device showing another embodiment of a retaining mechanism.

The retaining mechanism 7 shown in FIG. 11 is configured by a leaf spring 720 of shape memory alloy. The leaf spring 720 is inserted along the entire length in the length direction of the outer packaging 30 and battery cell group 6, in the space between two battery cell groups 6, 6 arranged in parallel, and both surfaces of the thin wall part 341 of the intermediate wall 34. The leaf spring 720 pulls apart the battery cell groups 6, 6 by generating spring counterforce between the intermediate wall 34 and each battery cell groups 6, 6, and applies pressure (spring counterforce) in a direction pressing against each of the respective battery cell groups 6, 6 so as to pull apart towards the two opposing outer side walls 33, 33.

Figure 12A:
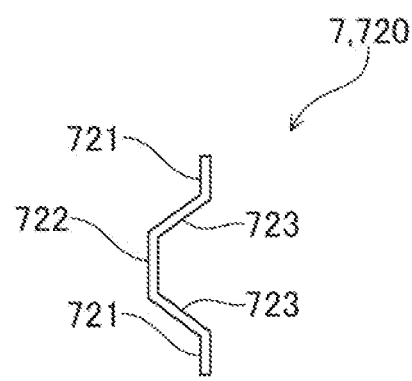
FIG. 12A is a view showing a decompressed state of a leaf spring used in the retaining mechanism shown in FIG. 11.
Figure 12B:
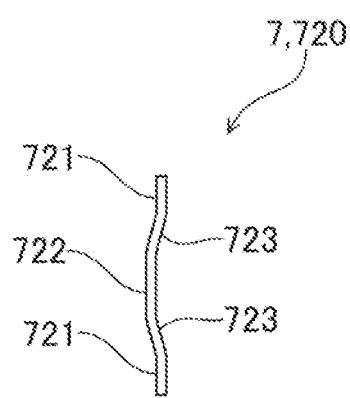
FIG. 12B is a view showing a compressed state of a leaf spring used in the retaining mechanism shown in FIG. 11.
Figure 12C:
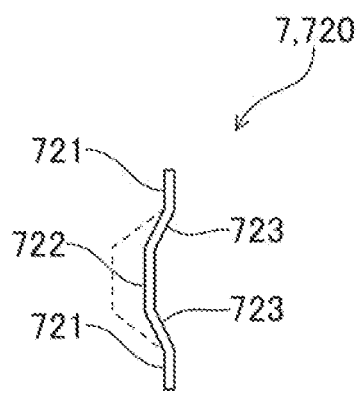
FIG. 12C is a view showing an aspect of the leaf spring used in the retaining mechanism shown in FIG. 11 recovering from the compressed state.

The leaf spring 720 has two first abutting surfaces 721, 721, a second abutting surface 722 between these first abutting surfaces 721, 721, and has a shape in which the first abutting surfaces 721, 721 and the second abutting surface 722 are connected by sloped surfaces 723, 723, at a room temperature state as shown in FIG. 12A. In FIG. 11, by the spring counterforce of the leaf spring 720, the first abutting surfaces 721, 721 abuts the side surface of the battery cell group 6 (battery cells 60), and the second abutting surface 722 abuts the intermediate wall 34; however, it may be the opposite. Since the leaf spring 720 is shape memory alloy, by the leaf spring 720 compressing so as to be substantially flat in a low temperature state before equipping in advance, it is possible to insert in the space between the intermediate wall 34 and each battery cell group 6, 6 while in this flat compressed state, as shown in FIG. 12B. Subsequently, the leaf spring 720 applies the spring counterforce against each battery cell groups 6, 6, when recovering to the original state gradually as shown in FIG. 12C accompanying temperature rise.

Such a leaf spring 720 can be inserted in the space between the intermediate wall 34 and each battery cell groups 6, 6 in the compressed state shown in FIG. 12B; therefore, the work to insert the leaf spring 720 is very easy without requiring the use of a tool, etc. Moreover, so long as there is a space small enough to be able to insert the leaf spring 720 in the compressed state inside of the outer packaging 30 housing the battery cell group 6, it is sufficient; therefore, it is possible to further decrease the size of the outer packaging 30.

Figure 14A:
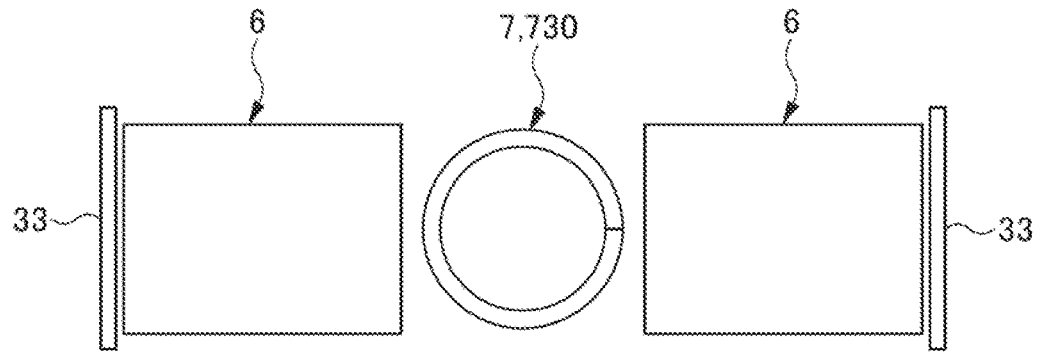
FIG. 14A is a schematic diagram viewing, from a lamination direction of battery cells, a relationship of a coil prior to generating pressing pressure against a battery cell group, with a battery cell group and outer side wall.
Figure 14B:
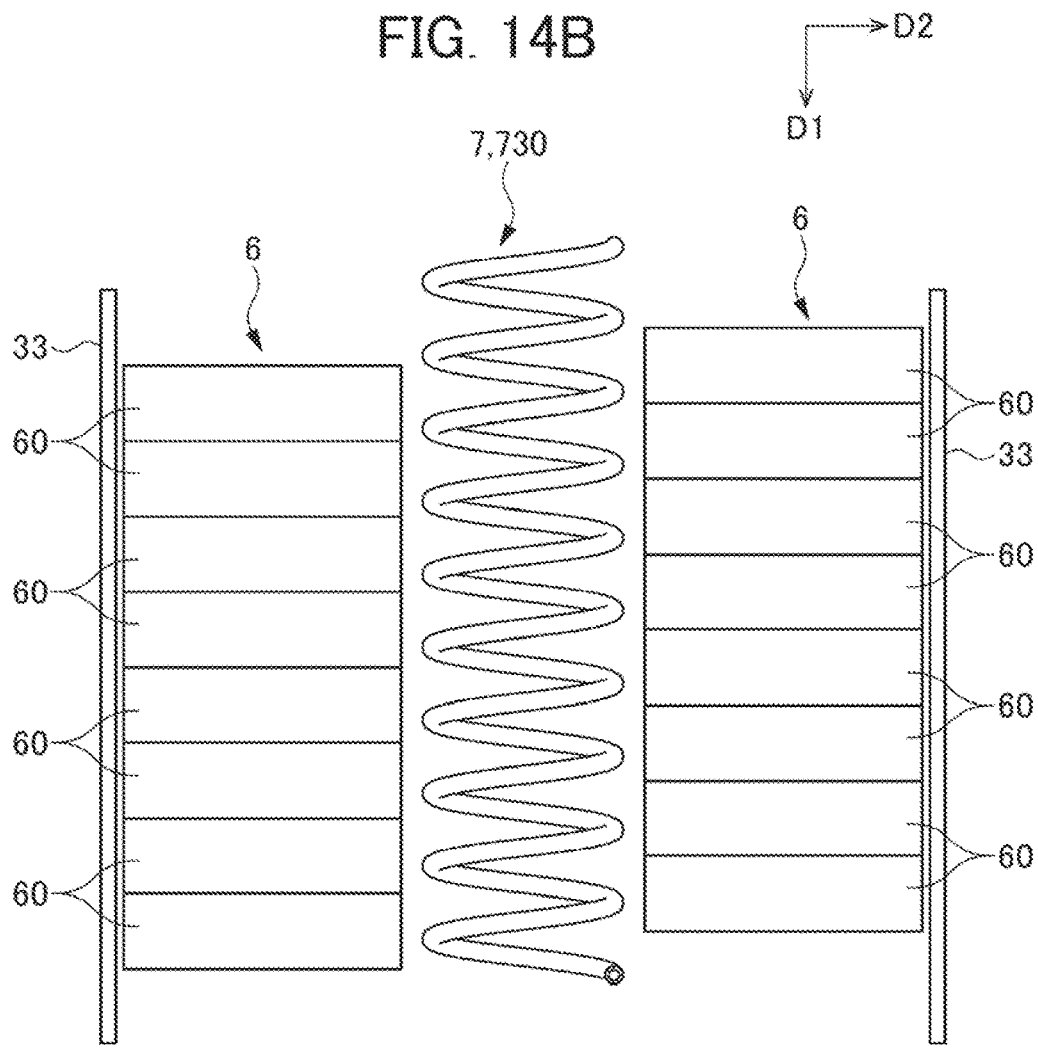
FIG. 14B is a schematic diagram viewing in a plane the relationship of a coil prior to generating pressing pressure against a battery cell group, with a battery cell group and outer side wall.

The retaining mechanism 7 shown in FIG. 13 is configured by a spiral coil 730 having elasticity. The coil 730 is arranged so that the axial direction of the coil 730 follows the lamination direction of the battery cell 60, between two battery cell groups 6, 6, as shown in FIGS. 14A, 14B. The pitch of the coil 730 is substantially equal to the pitch in the lamination direction of each battery cell 60 of two battery cell groups 6, 6. It should be noted that the intermediate wall 34 inside of the outer packaging 30 is not provided herein. In addition, in FIG. 14B, illustration of the separator 61 between adjacent battery cells 60, 60 in the lamination direction is omitted.

Figure 15B:
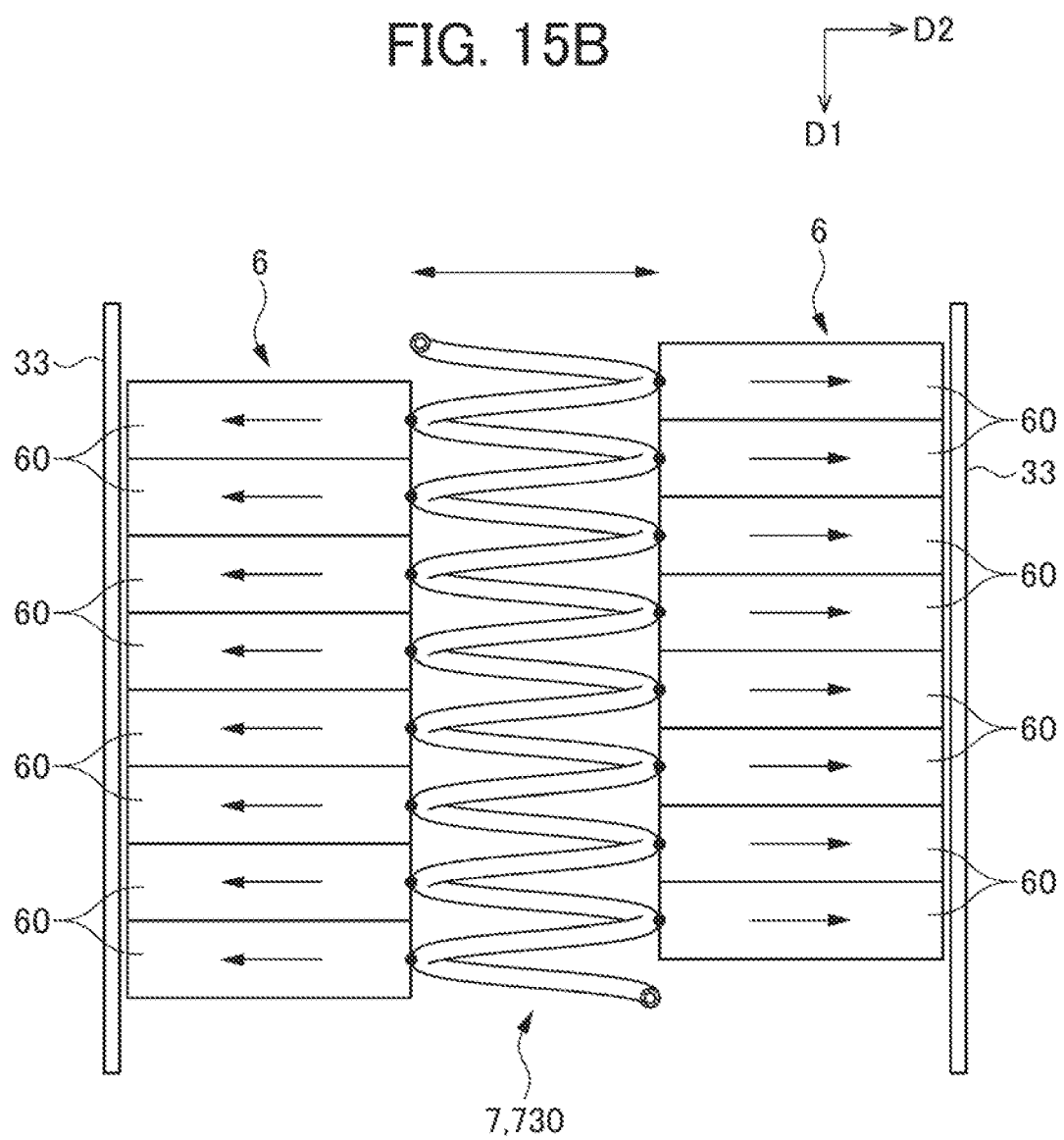
FIG. 15B is a schematic diagram viewing in a plane the relationship of a coil in a state generating pressing pressure against a battery cell group, with a battery cell group and outer side wall.

The coil 730 shown in FIGS. 14A, 14B does not apply a pressing force on the battery cell groups 6, 6. From this state, when fixing an end of the coil 730 and rotationally displacing the other end in the winding direction or opposite direction of the coil 730, the coil 730 will elastically expand in diameter. The coil 730 can thereby pull apart the battery cell groups 6, 6 and apply pressure in the direction pressing towards the opposing two outer side walls 33, 33, against each of the respective battery cell groups 6, 6, as shown in FIGS. 15A and 15B. At this time, the coil 730 abuts each of the battery cells 60 of the respective battery cell groups 6, 6, and applies pressure individually to the battery cells 60.

The coil 730 expanded in diameter elastically, even if there is variation in the width dimension of individual battery cells 60, can easily follow by the diameter expansion amount of each pitch of the coil 730 varying. For this reason, the coil 730 can uniformly apply pressure in a direction pressing against all battery cells 60 of the battery cell groups 6, 6. Moreover, the space in the central part of the coil 730 can also be used as a space accommodating or allowing to insert a constituent component such as wiring, etc. provided to the battery cell groups 6, 6.

The coil 730 can be formed by spirally winding a hollow wire having a heat transfer property, as shown in FIG. 13. In this case, by flowing the temperature-adjusting medium consisting of air or liquid inside of the coil 730 consisting of hollow wire, the inside of the coil 730 can configure a temperature-adjusting medium flow path (second temperature-adjusting medium flow path) 731. It is thereby possible to carry out heat exchange between each battery cell 60, by not only the temperature-adjusting medium flow path 36 provided to the outer side wall 33, but also the temperature-adjusting medium flow path 731 within the coil 730. For this reason, the battery cell 60 can carry out more efficient heat exchange with the heat exchange medium.

Figure 16:
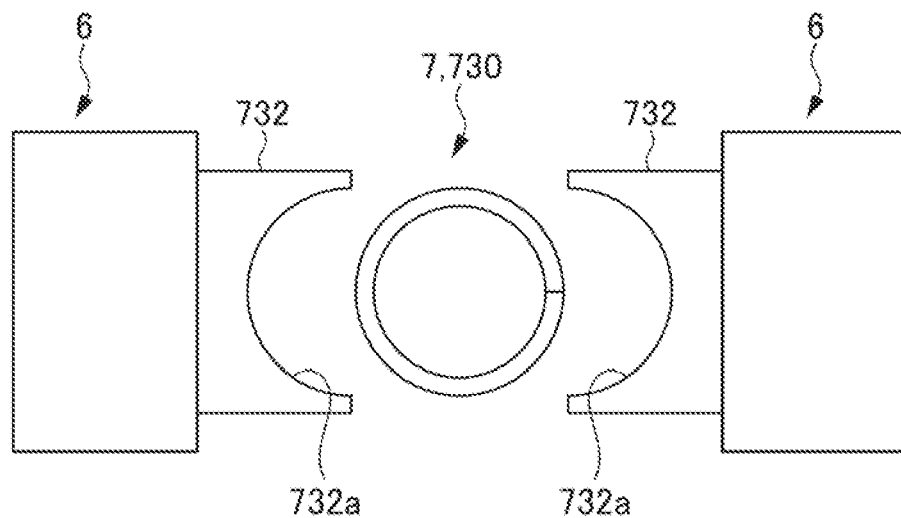
FIG. 16 is a schematic diagram showing an aspect of interposing a contact member between the coil and the battery cell.

As shown in FIG. 16, it may be configured to arrange a contact member 732 having a heat transfer property between the coil 730 and the battery cell groups 6, 6. The contact member 732 is formed from silicone or the like. The surface of the contact member 732 opposing the coil 730 comes to be a circular arc surface 732a recessed so as to follow the outer circumferential surface of the coil 730. The contact member 732 disperses the contact pressure to the battery cell 60 by the coil 730, and suppresses defects such as deformation of the battery cells 60 while maintaining heat exchange efficiency.

Figure 17A:
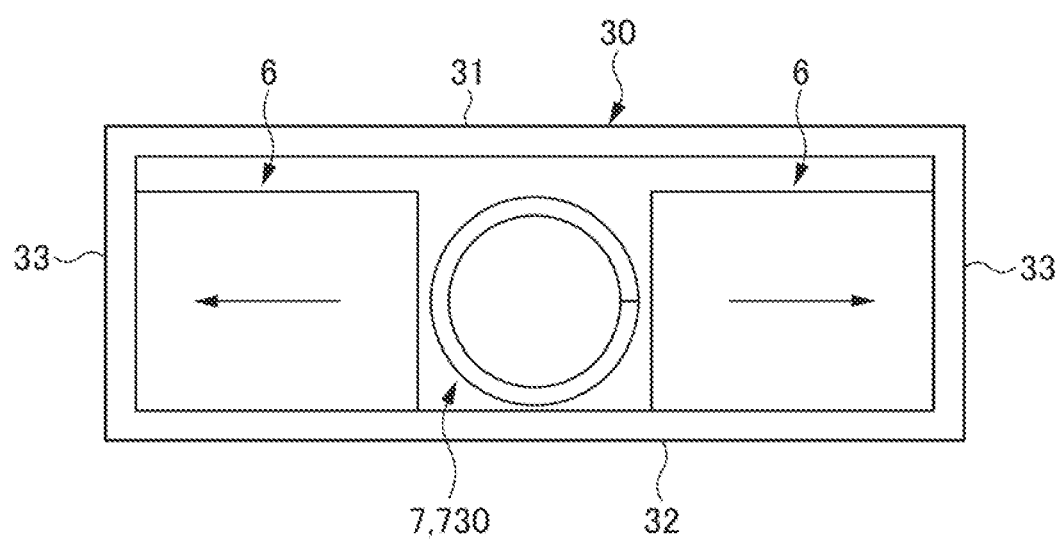
FIG. 17A is a schematic diagram showing an example of an arrangement relationship between the battery cell group within the outer packaging and the coil.
Figure 17B:
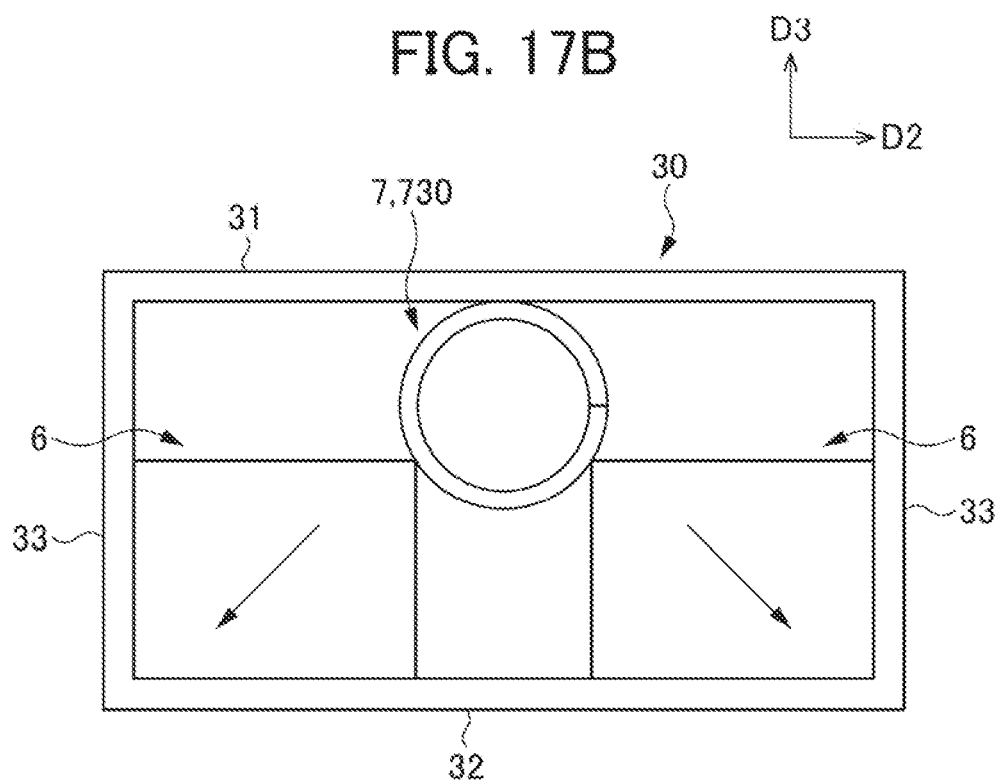
FIG. 17B is a schematic diagram showing another example of an arrangement relationship between the battery cell group within the outer packaging and the coil.

The coil 730 can also easily change the pressing direction against the battery cell group 6 within the outer packaging 30, by causing the arrangement within the outer packaging 30 to variously change, as shown in FIGS. 17A to 17F. For example, as shown in FIG. 17A, in the case of the coil 730 being arranged between two battery cell groups 6, 6, the dimension in the height direction of the outer packaging 30 is suppressed. On the other hand, as shown in FIG. 17B, in the case of the coil 730 being arranged obliquely upwards relative to two battery cell groups 6, 6, the dimension in the width direction of the outer packaging 30 is suppressed.

Figure 17C:
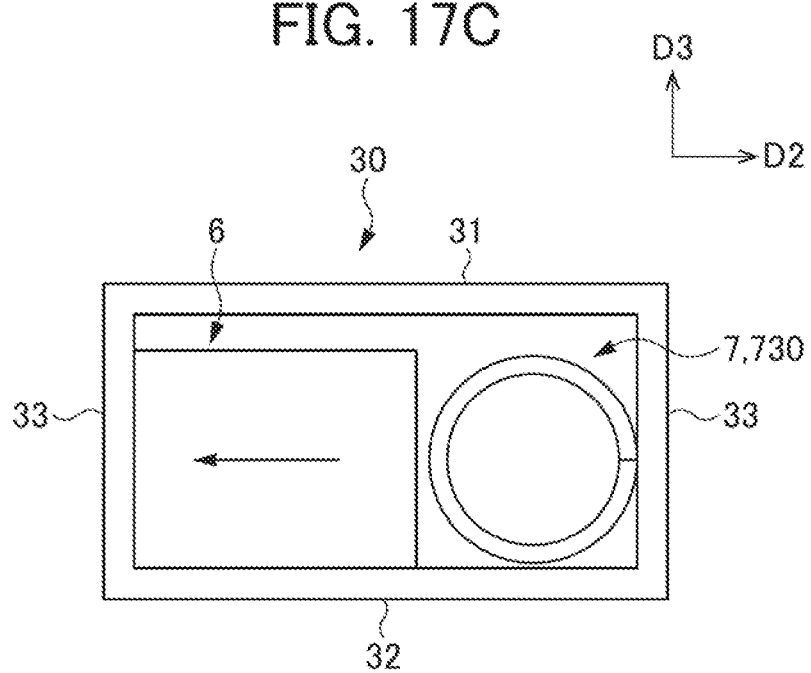
FIG. 17C is a schematic diagram showing another example of an arrangement relationship between the battery cell group within the outer packaging and the coil.
Figure 17D:
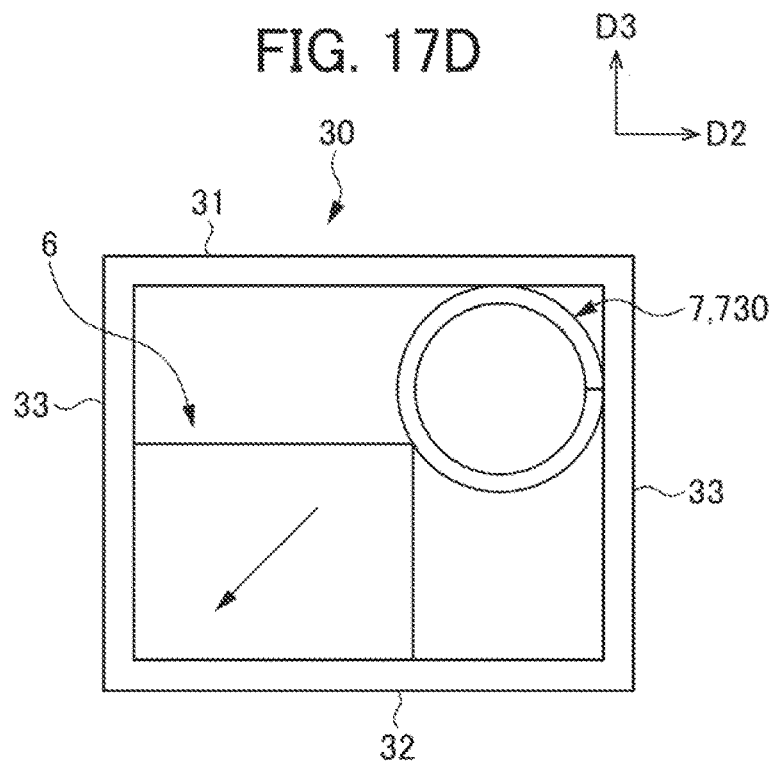
FIG. 17D is a schematic diagram showing another example of an arrangement relationship between the battery cell group within the outer packaging and the coil.

FIG. 17C shows a case of only one battery cell group 6 being accommodated within the outer packaging 30. The coil 730 is arranged between the battery cell group 6 and one outer side wall 33. The height dimension of the outer packaging 30 is thereby suppressed. In addition, the coil 730 can press and retain one battery cell group 6 within the outer packaging 30 towards the outer side wall 33. On the other hand, in FIG. 17B, the coil 730 is arranged obliquely upward relative to the one battery cell group 6 within the outer packaging 30. The dimension in the width direction of the outer packaging 30 is thereby suppressed. In addition, the coil 730 can press and retain one battery cell group 6 within the outer packaging 30 towards the outer side wall 33.

Figure 17E:
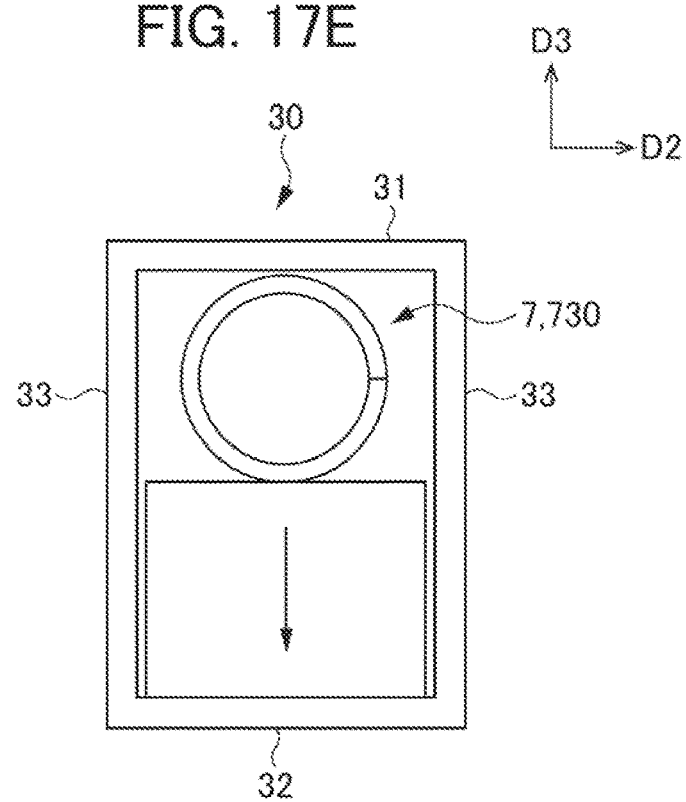
FIG. 17E is a schematic diagram showing another example of an arrangement relationship between the battery cell group within the outer packaging and the coil.
Figure 17F:
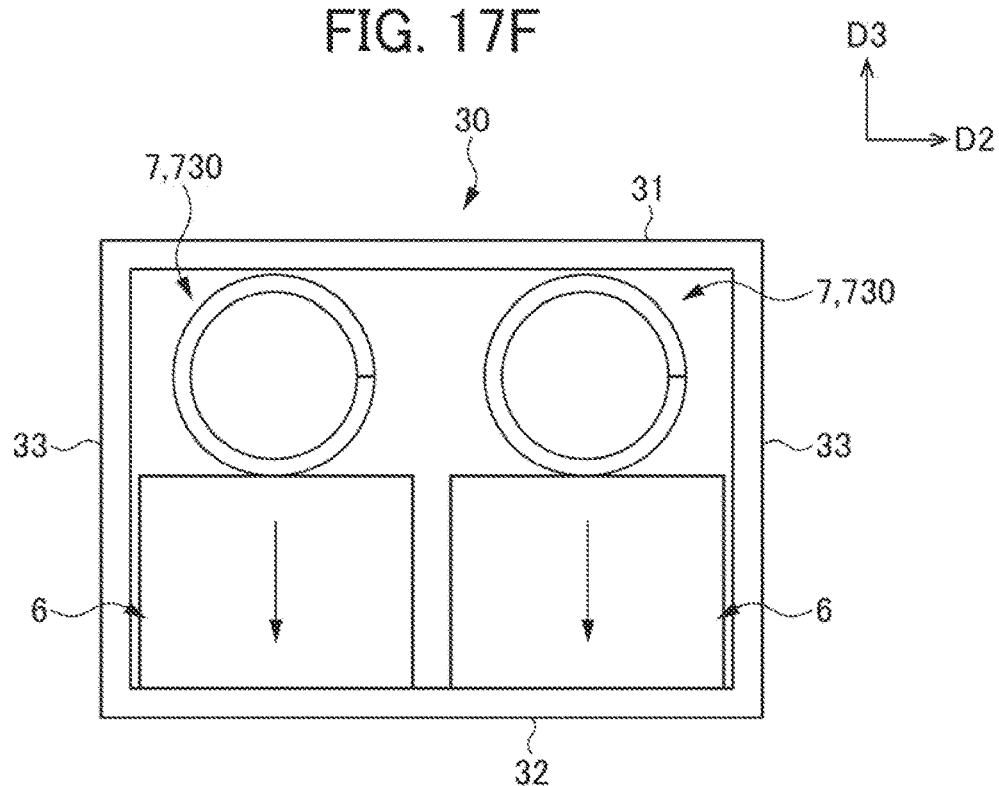
FIG. 17F is a schematic diagram showing another example of an arrangement relationship between the battery cell group within the outer packaging and the coil.

In the case of the battery cell group 6 within the outer packaging 30 being able to contact in a heat exchangeable manner with the outer side wall 33 by way of another retaining mechanism 7, the coil 730 may not necessarily press towards the outer side wall 33 against the battery cell group 6. For example, as shown in FIG. 17E, it may be configured so that one coil 730 presses one battery cell group 6 within the outer packaging 30 against the lower side wall 32 of the packaging 30. In addition, as shown in FIG. 17F, the two coils 730, 730 corresponding to the two battery cell groups 6, 6 within the outer packaging 30 may press each battery cell group 6 against the lower side wall 32 of the outer packaging 30.

Figure 18A:
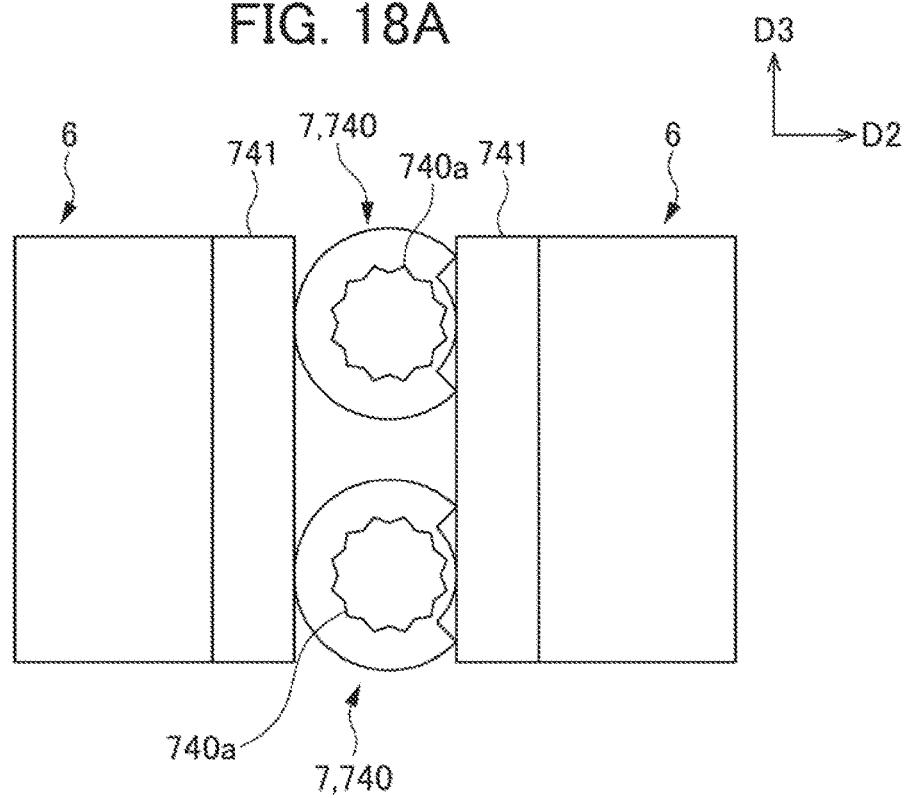
FIG. 18A is a schematic diagram showing a state in which a cam member according to another embodiment of the retaining member is not generating pressing pressure.
Figure 18B:
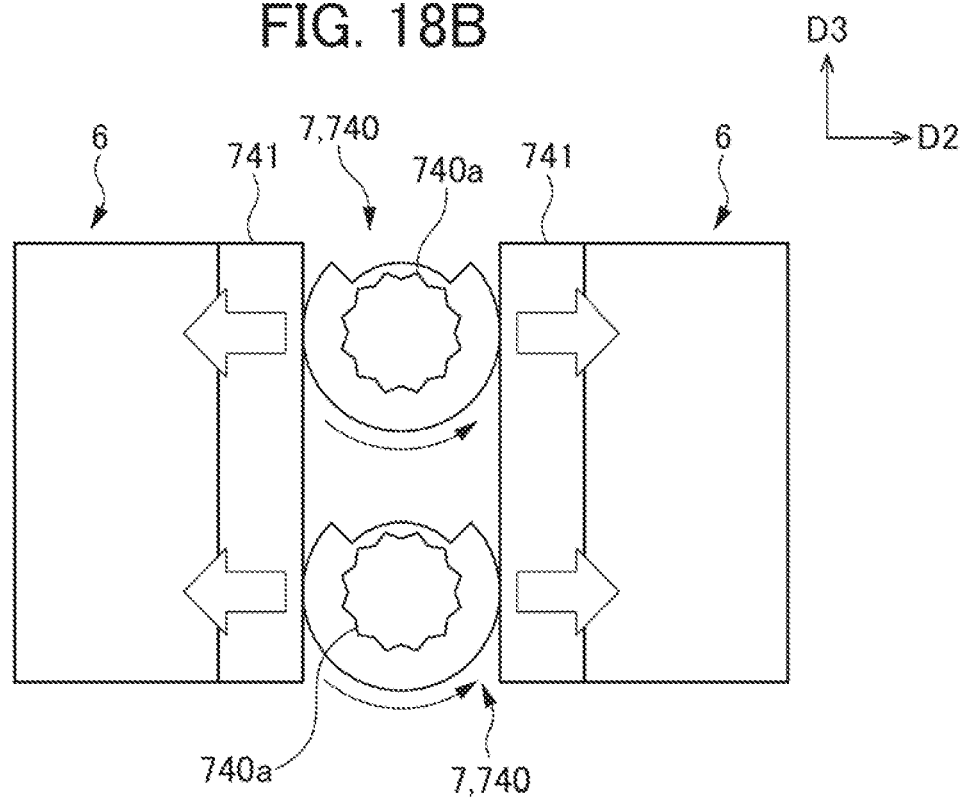
FIG. 18B is a schematic diagram showing a state in which the cam member shown in FIG. 18A is generating pressing pressure.

The retaining mechanism 7 shown in FIGS. 18A, 18B is configured by a cam member 740. The cam member 740 consists of a rigid body of aluminum, aluminum alloy or the like. The axial direction (rotation center) of the cam member 740 extends along the length direction of the outer packaging 30. The cam member 740 has a cross-sectional shape in which the radius continuously changes (increases) relative to the rotation direction from the rotation center.

FIG. 18A shows a state arranging the two cam members 740, 740 along the height direction between the two battery cell groups 6, 6. The intermediate wall 34 is not provided inside of the outer packaging 30. A pressing plate 741 is interposed between the cam members 740, 740 and battery cell groups 6, 6. The pressing plate 741 prevents damage to the battery cell 60 due to sliding of the cam member 740.

FIG. 18A shows a state in which the radius of two cam members 740, 740 is reduced relative to the pressing direction (direction along D2 direction) relative to the battery cell group 6. From this reason, when each cam member 740, 740 rotates, the radius of the cam members 740, 740 along the pressing direction of the battery cell groups 6, 6 gradually increases. FIG. 18B shows a state in which the radius of the cam members 740, 740 along the pressing direction relative to the battery cell group 6 increased the most. When the cam members 740, 740 are arranged at rotational displacement positions shown in FIG. 18B from the rotation displacement position shown in FIG. 18A, the battery cell groups 6, 6, are pushed to the outer circumferential surface of the cam members 740, 740 to be separated, and pressed towards opposing directions.

According to the retaining mechanism 7 configured by such a cam member 740, it is possible to constantly maintain the pressing pressure of the battery cell group 6, by adjusting the rotational displacement amount of the cam member 740. In addition, since the cam member 740 consists of a rigid body, even if the momentary G is generated on the battery cell group 6, it is possible to maintain the pressing pressure.

Figure 19:
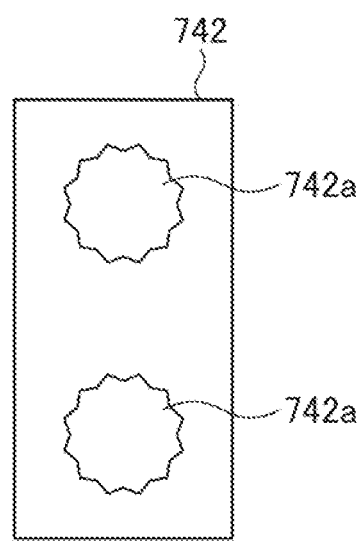
FIG. 19 is a front view showing a fixing member of the cam member.

The retaining mechanism 7 configured by the cam member 740 preferably has a fixing member 742 for maintaining the rotational displacement position of the cam member 740. FIG. 19 shows an example of the fixing member 742. The fixing member 742 consists of a metallic plate, and has two engaging holes 742a, 742a corresponding to the above-mentioned two cam members 740, 740 arranged within the outer packaging 30. The engaging hole 742a is formed in a polygonal shape (star shape in the present embodiment) which can insert the rotational shaft 740a of the polygonal shape (star shape in the present embodiment) of the cam member 740 and engage therewith. The fixing member 742 allows a rotation shaft 740a of the respective cam members 740 to be inserted into each engaging hole 742a, to be fixed to the end surface 30a of the outer packaging 30, for example. It is thereby possible to easily maintain the cam member 740 at a predetermined rotational displacement position.

The retaining mechanism 7 shown in FIG. 20 is configured by a pressing member 750 consisting of plastically deformable metal such as aluminum or aluminum alloy. The pressing member 750 is formed in cylindrical shape, extends along the length direction of the outer packaging 30, and is arranged between the two battery cell groups 6, 6 within the outer packaging 30. The intermediate wall 34 is not provided inside of the outer packaging 30. FIG. 20 shows the pressing member 750 before plastic deformation. In this state, the pressing member 750 is narrow, and can be easily inserted to a space between parallel battery cell groups 6, 6. Between the pressing member 750 and battery cell groups 6, 6, a contact member 751 for preventing deformation or the like of the battery cell 60 by contact with the pressing member 750 is interposed.

The pressing member 750 inserted between the battery cell groups 6, 6 is plastically deformed by being crimped from vertical directions using the appropriate crimping tool. FIGS. 21A and 21B show an example of a method for crimping the pressing member 750 using the crimping tool 752. The crimping tool 752 has a plurality of crimping members 752b at the circumference of the shaft part 752a. The crimping tool 752 shown in the present embodiment has three crimping members 752b aligned in the axial direction of the shaft part 752a. The size in the height direction of each crimping member 752b differs, and is formed so that the height gradually becomes bigger as moving from the right side to left side in FIG. 21A.

The crimping tool 752 is inserted above and below the pressing member 750 from the side of one end surface 30a of the outer packaging 30, as shown in FIG. 21A. At this time, the crimping tool 752 is inserted inside the outer packaging 30 from a side of the crimping member 752b having the smallest height. Subsequently, the crimping tool 752 is pushed so as to penetrate between the outer packaging 30 and pressing member 750 along the length direction of the outer packaging 30. As shown in FIG. 21B, the pressing member 750 is crushed gradually from the vertical direction, by the plurality of crimping members 752b for which the height gradually increases. Accompanying this, the pressing member 750 is widened in the horizontal direction (direction along D2 direction).

The widened pressing member 750 respectively abuts the left and right contact members 751, 751 to separate the battery cell groups 6, 6 via the contact members 751, 751, and applies pressure in a direction pressing to the opposing outer side walls 33, 33 against each battery cell group 6, 6. Since the widened state of the pressing member 750 after plastic deformation is maintained, the pressing member 750 can apply stable pressing pressure against the battery cell groups 6, 6. It should be noted that, so long as the pressing member 750 is plastically deformable so as to be widened by crushing from the vertical directions, it is not limited to being formed in a hexagonal tubular shape, and may be a cylindrical shape, for example.

Figure 22A:
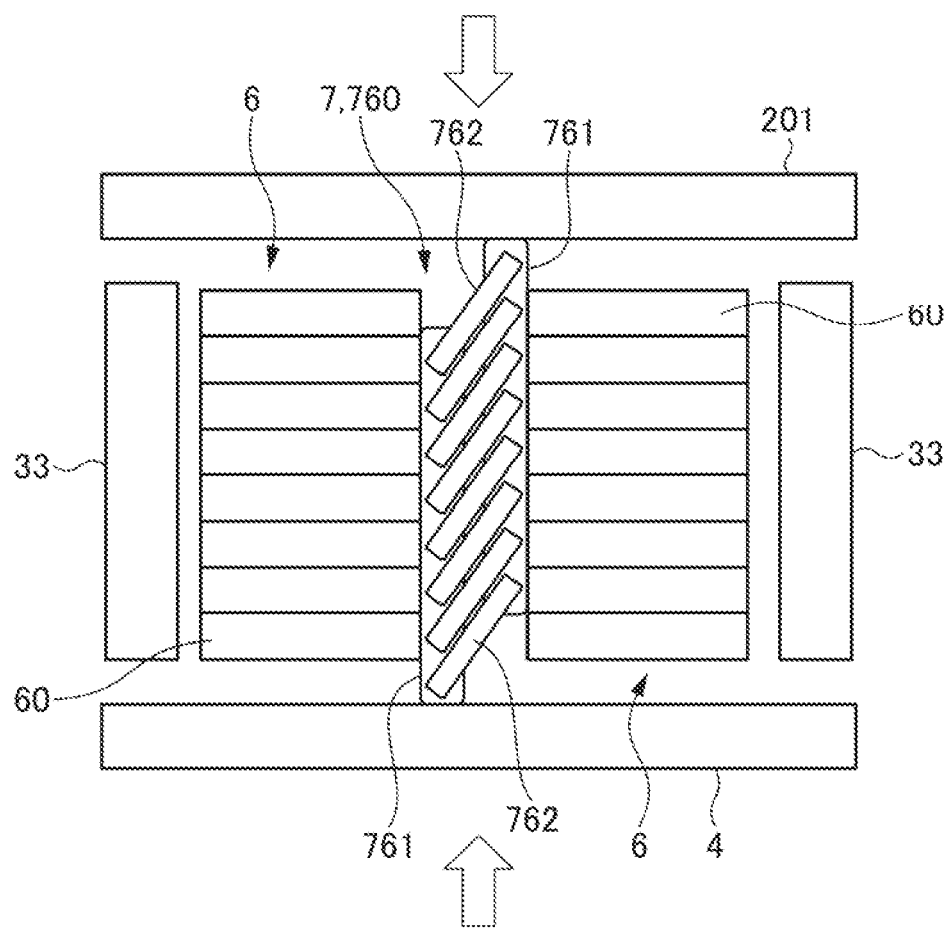
FIG. 22A is a schematic diagram showing a state in which a link mechanism according to another embodiment of the retaining mechanism is not generating a pressing pressure.

The retaining mechanism 7 shown in FIGS. 22A and 22B is configured by a link mechanism 760. The intermediate wall 34 is not provided inside of the outer packaging 30. The link mechanism 760 has two parallel support plates 761, 761 arranged along the lamination direction of the battery cells 60, and a plurality of parallel connecting members 762 which connect between these two support plates 761, 761. Both end parts of the connecting members 762 are rotatably connected to each support plate 761, 761. The link mechanism 760 configured in this way can shrink or widen the interval of support plates 761, 761 by relatively moving the two support plates 761, 761 in opposite directions along the lamination direction of the battery cells 60.

The link mechanism 760 is arranged so that the two support plates 761, 761 oppose the side surfaces of respective battery cell groups 6, 6, between the two battery cell groups 6, 6 within the outer packaging 30. At this time, the link mechanism 760 is established in a state closing the interval of two support plates 761, 761, and shrinking the width direction, as shown in FIG. 22A. In this state, the link mechanism 760, due to not generating any pressure in the pressing direction on the battery cells 6, 6, can easily be inserted between the battery cell groups 6, 6, within the outer packaging 30. Subsequently, when the two support plates 761, 761 relatively move in opposite directions from each other along the lamination direction of the battery cells 60, the interval of the support plates 761, 761 widens as shown in FIG. 22B. The link mechanism 760 thereby separates the battery cell groups 6, 6, and applies pressure in a direction pressing towards opposing outer side walls 33, 33 against each battery cell groups 6, 6.

The interval of the support plates 761, 761 can be widened by applying a force pinching the support plates 761, 761 along the lamination direction of the battery cells 60, as shown in FIG. 22A. The support plates 761, 761 can sandwich using the end plates. In FIGS. 22A and 22B, the support plates 761, 761 are pinched between the end plate 4, and the side wall part 201 of the I/F box 2 functioning as the end plate. It is thereby possible to operate the link mechanism 760 by simply pinching the battery cell groups 6, 6 using the end plates (end plate 4, side wall part 201) from both sides. For this reason, special work for operating the link mechanism 760 is unnecessary, and it is possible to easily apply pressing pressure against the battery cell groups 6, 6.

Figure 23:
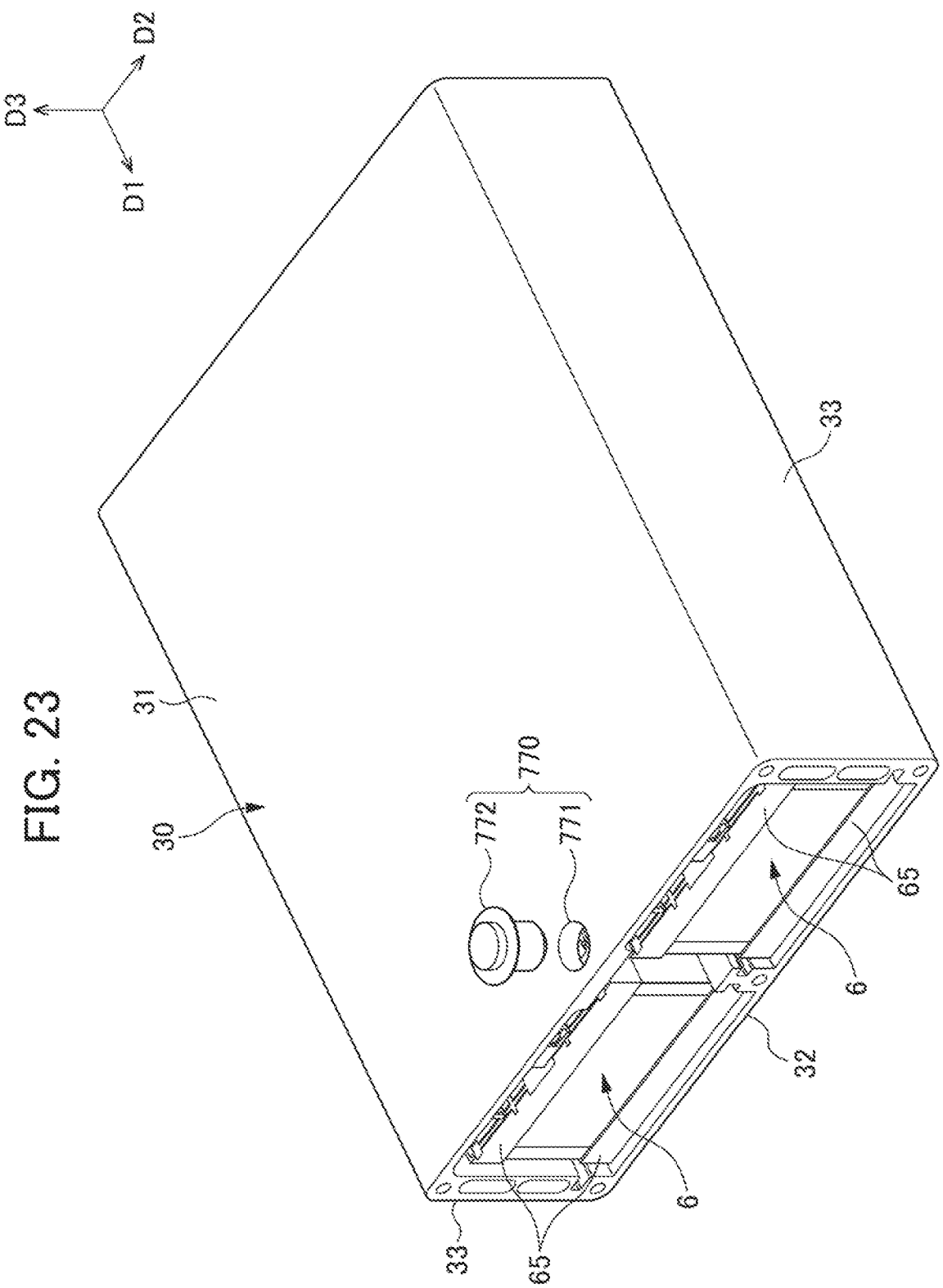
FIG. 23 is a perspective view showing an outer packaging having a retaining mechanism made using a wedge member.

The retaining mechanism 7 shown in FIG. 23 is configured by a wedge mechanism 770 having a through hole 771 penetrating the outer packaging 30, and a wedge member 772 inserted in this through hole 771. The intermediate wall 34 is not provided inside of the outer packaging 30. The through hole 771 shown in the present embodiment is arranged in the corresponding upper side wall 31 between the two battery cell groups 6, 6 in the outer packaging 30. The leading end of the columnar shaft part 772a of the wedge member 772 has a sloped surface 772b formed in a tapered shape. This wedge member 772 has a male thread in the outer circumferential surface of the shaft part 772a, and is configured so as to thread with the female thread formed in the through hole 771.

Figure 24:
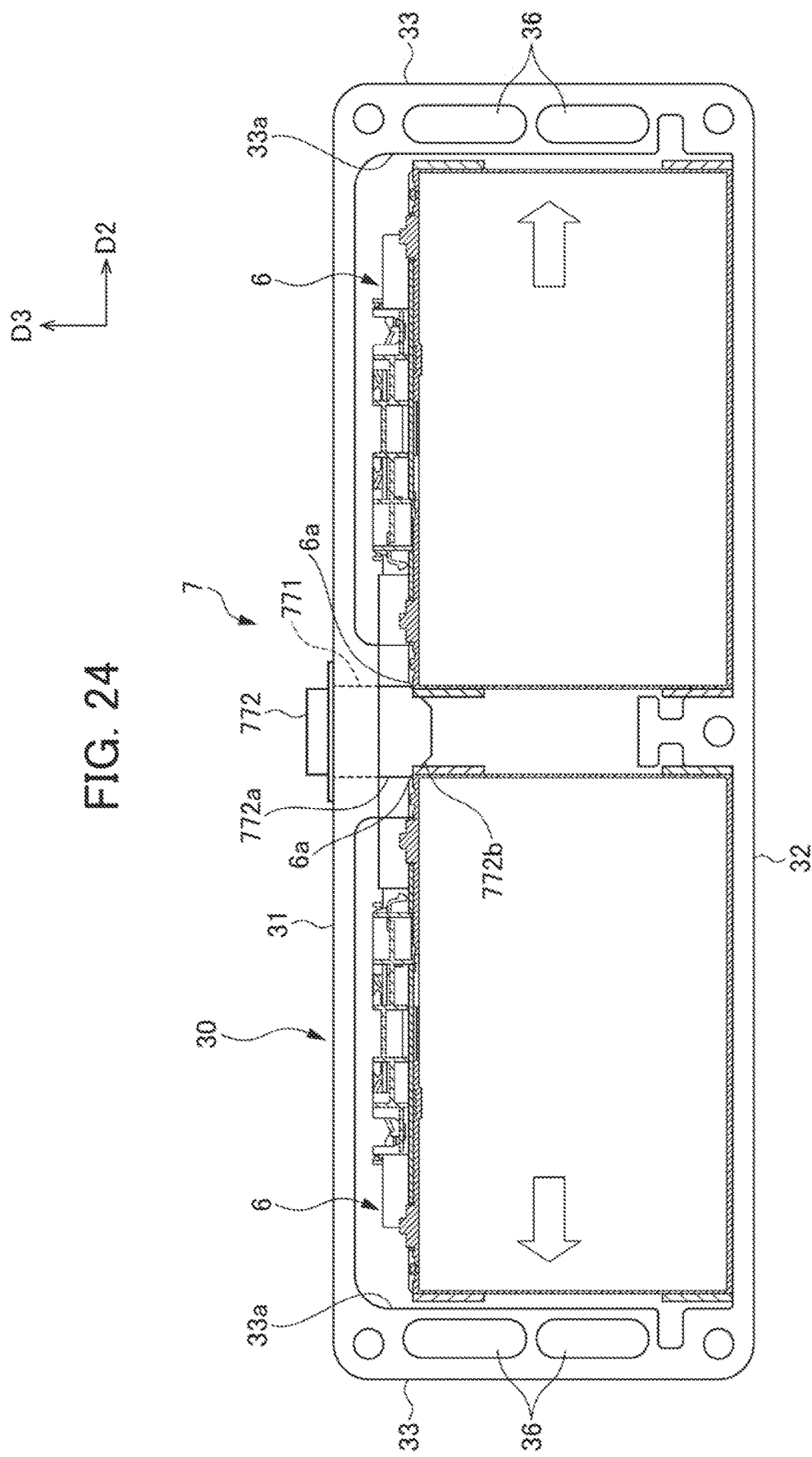
FIG. 24 is a view showing an outer packaging interior having a retaining mechanism made using a wedge member.

When the wedge member 772 is threaded to the through hole 771, the sloped surface 772b of the leading end of the shaft part 772a abuts corner parts 6a, 6a of the battery cell groups 6, 6, as shown in FIG. 24. When the wedge member 772 is further pushed, the sloped surface 772b presses the corner parts 6a, 6a of the battery cell groups 6, 6 to separate the two battery cell groups 6, 6 along this sloped surface 772b, and presses in opposite directions towards the outer side walls 33, 33. For this reason, by simply inserting the wedge member 772 in the through hole 771 from outside of the outer packaging 30, it is possible to easily apply pressing pressure against the battery cell groups 6, 6, within the outer packaging 30. In addition, since the wedge member 772 is threaded to the through hole 771, it is possible to easily adjust the pressing amount on the battery cell groups 6, 6, by adjusting the rotation amount of the wedge member 772.

The wedge mechanism 770 can also be provided in plurality to the outer packaging 30. The battery cell group 6 preferably is integrated by an appropriate restraining band 65 as shown in FIGS. 23 and 24. It is thereby possible to press the battery cell group 6 by a small number of wedge mechanisms 770. For this reason, it is possible to reduce the number of parts, and the assembly property of the battery device 1 is also favorable. It should be noted that the wedge mechanism 770 may be configured so as to insert the wedge member 772 from the lower side wall 32 of the outer packaging 30.

Figure 25:
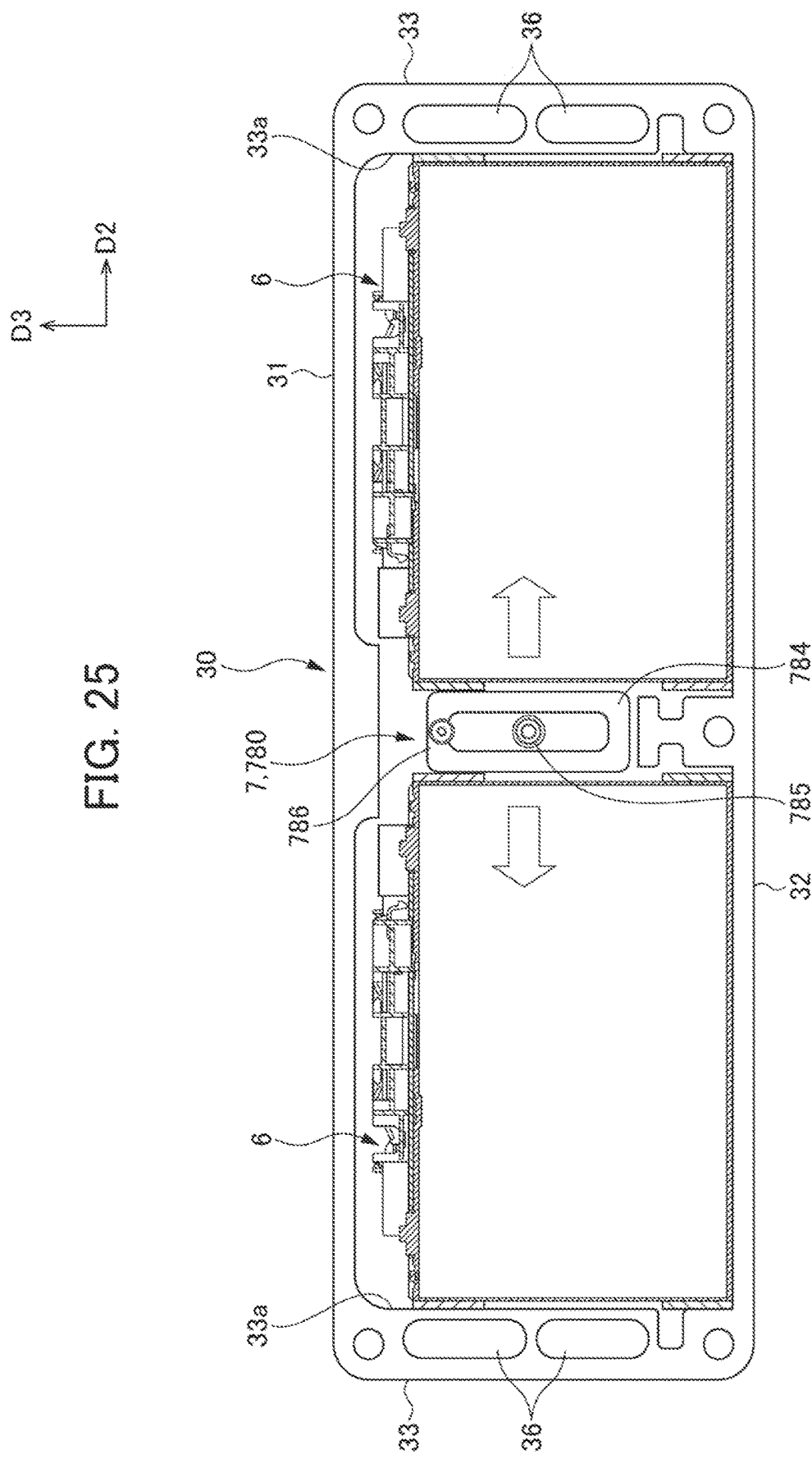
FIG. 25 is a view showing an outer packaging interior made using a filling member according to another embodiment of the retaining mechanism.
Figure 26:
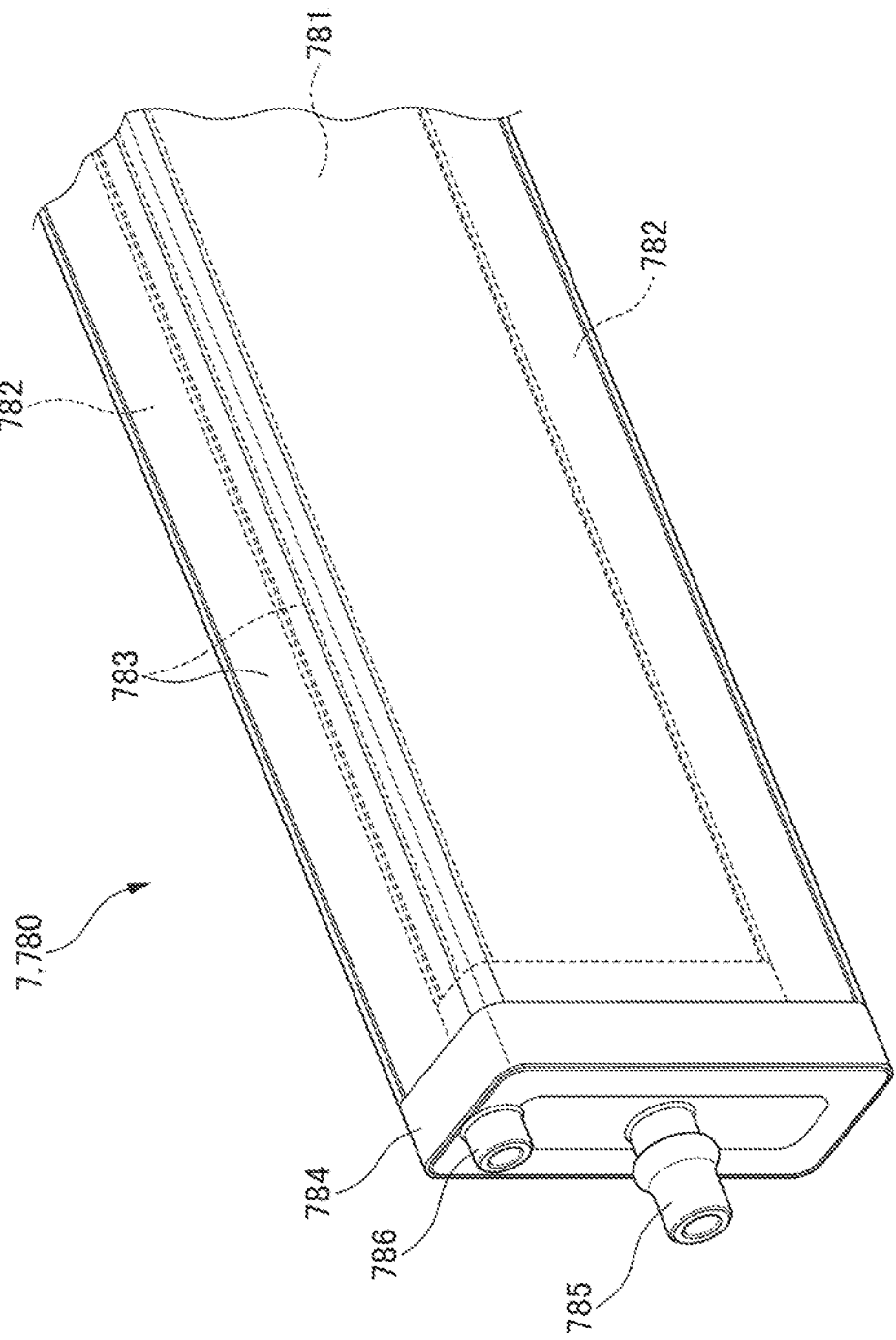
FIG. 26 is a perspective view showing main parts of the filling member shown in FIG. 25.
Figure 27:
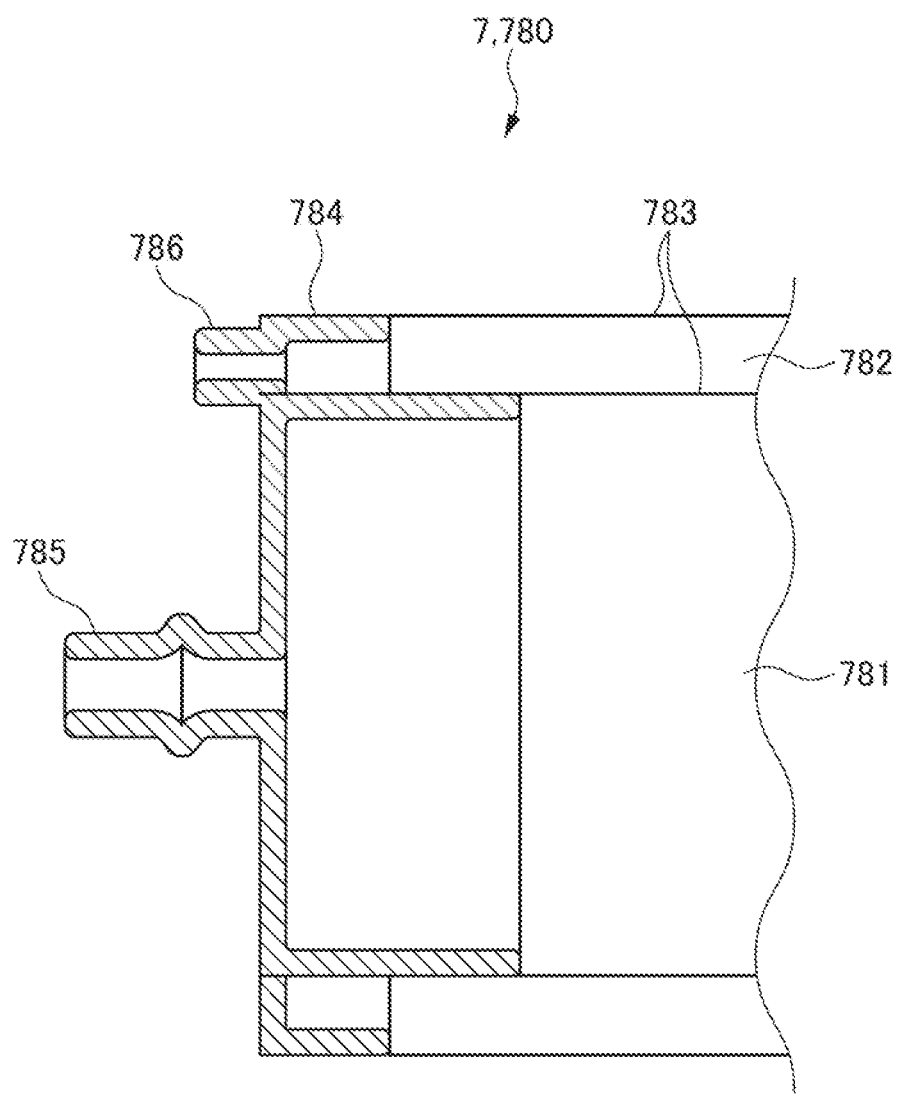
FIG. 27 is a principal cross-sectional view of the filling member shown in FIG. 26.

The retaining mechanism 7 shown in FIG. 25 is configured by a filling member 780. The intermediate wall 34 is not provided inside of the outer packaging 30. The filling member 780 has a substantially rectangular parallelepiped shape, and is arranged between two battery cell groups 6, 6, within the outer packaging 30 to extend over the entire length in the lamination direction of the battery cell 60. The filling member 780 has a gas filled layer 781 in which a gas such as air is filled, and a resin filled layer 782 in which curable resin such as epoxy resin is filled, as shown in FIGS. 26 and 27. The resin filled layer 782 is arranged at the outer circumference of the gas filled layer 781 to encompass this air filled layer 781. Compared to the gas filled layer 781 arranged at the center, the resin filled layer 782 of the outer circumference thereof is formed in a thin layer form. Therefore, compared to the gas filled layer 781, the volume of the resin filled layer 782 is small. This gas filled layer 781 and resin filled layer 782 are configured by a double-structured bag-like flexible laminate film 783, for example.

At one end of the filling member 780, a terminal part 784 formed by a hard material such as metal or hard resin is provided. The terminal part 784 has a first joint part 785 for gas filling which communicates with inside of the gas filled layer 781, and a second joint part 786 for resin filling which communicates with inside of the resin filled layer 782. The first joint part 785 and second joint part 786 project from the terminal part 784.

The filling member 780 is inserted between the battery cell groups 6, 6 within the outer packaging 30, in a contracted state in which neither of the gas and curable resin are substantially filled to the gas filled layer 781 and resin filled layer 782. Since the filling member 780 is the contracted state, it is possible to easily perform insertion work. Subsequently, first, the gas is injected into the gas filled layer 781 from the first joint part 785. The gas filled layer 781 thereby expands to separate the battery cell groups 6, 6 to apply pressure in a direction pressing towards the opposing outer side wall 33, against the respective battery cell groups 6, 6. However, since the pressure at this time is a pressure from gas having compressibility in the gas filled layer 781, it is not sufficient to stably retain the battery cell group 6 to the outer side wall 33.

Next, when the curable resin is injected into the resin filled layer 782 from the second joint part 786, the resin filled layer 782 expands to apply pressure in a pressing direction further towards the outer side wall 33 against the battery cell group 6. Subsequently, when the curable resin within the resin filling layer 782 hardens, the pressing pressure by the filling member 780 is maintained. The filling member 780 can thereby stably retain the battery cell group 6 against the outer side wall 33.

According to this filling member 780, by way of expansion of the gas filled layer 781, it is possible to separate the battery cell groups 6, 6 and apply pressure in a direction pressing towards the opposing outer side walls 33, 33 against each battery cell group 6, 6, without waiting for curing of the curable resin within the resin filled layer 782. For this reason, until the curable resin cures, it is unnecessary to press the battery cell group 6 towards the outer side wall 33 using another means. After curing of the curable resin, since the pressing pressure is maintained, it is possible to easily apply stable pressing pressure to the battery cell group 6. In addition, the gas filled layer 781 and resin filled layer 782 can easily follow the side surface shape of the battery cell groups 6, 6. Therefore, the filling member 780 can permit variation in the width dimension of each of the battery cells 60, and apply equal pressure to individual battery cells 60. The filling member 780 uses the first joint part 785 and second joint part 786 of the terminal part 784, and can easily perform injection work of gas and curable resin from the side of the end surface 30a of the outer packaging 30.

Figure 28:
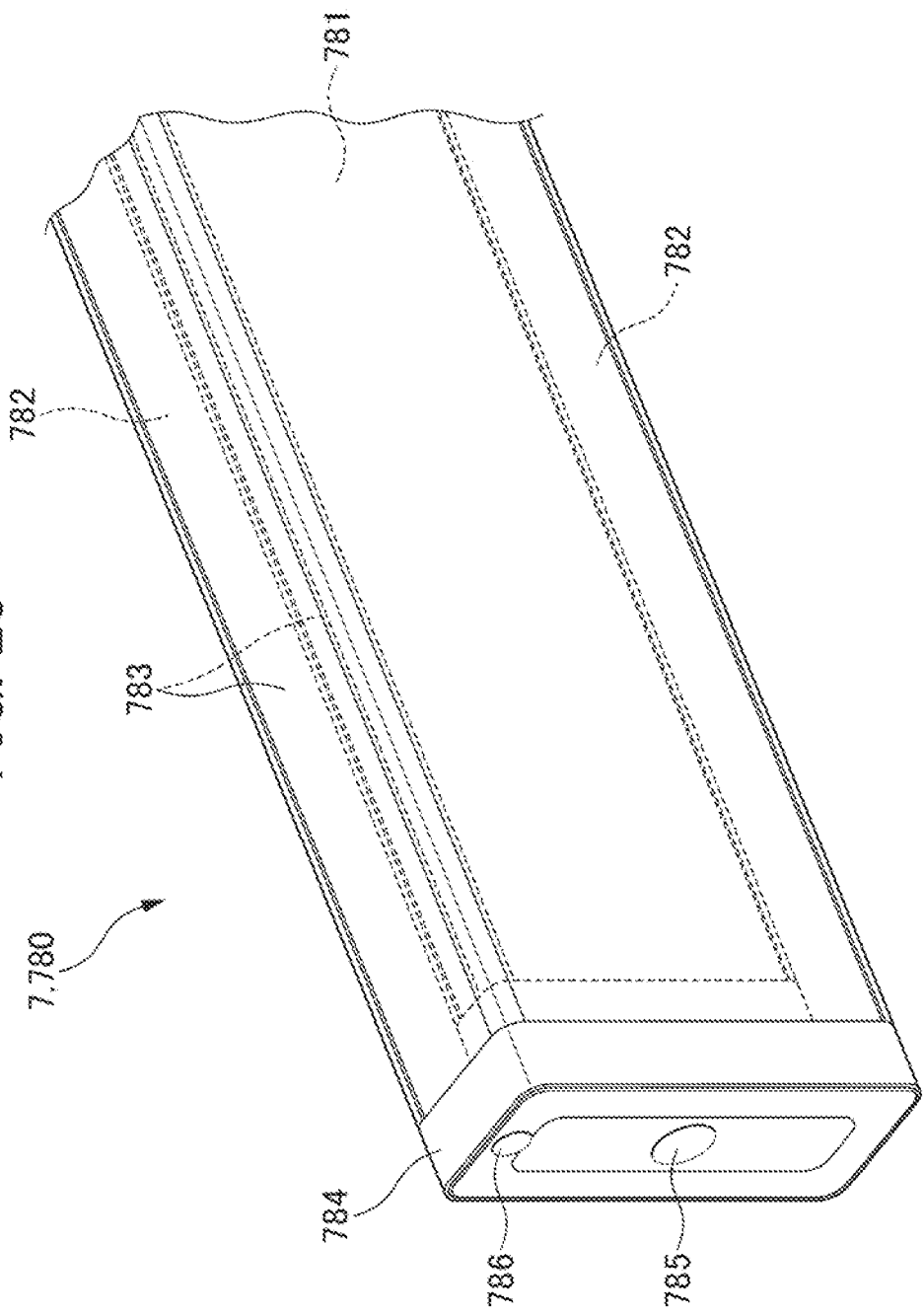
FIG. 28 is a perspective view showing main parts of another embodiment of the filling member.
Figure 29:
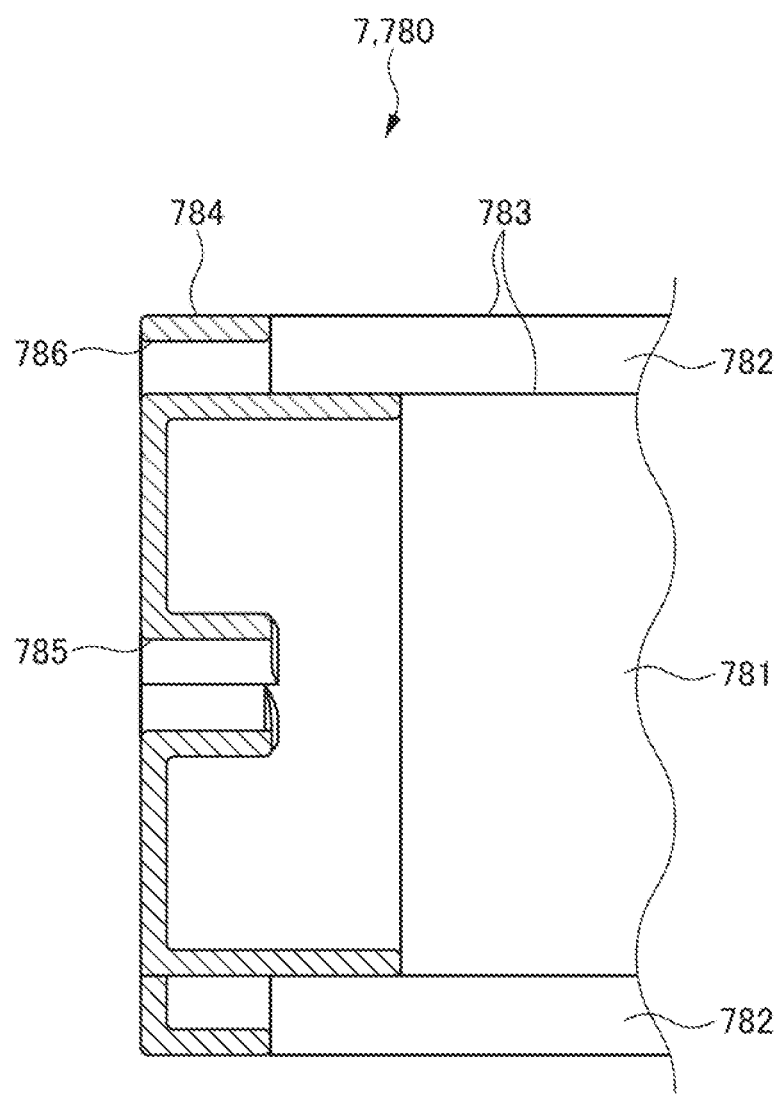
FIG. 29 is a principal cross-sectional view of the filling member shown in FIG. 28.

The first joint part 785 and second joint part 786 of the terminal part 784 of the filling member 780 may be a female joint part, as shown in FIG. 28 and FIG. 29. Since the projecting amount of each joint part 785, 786 from the terminal part 784 is suppressed, a size reduction in the terminal part 784 is possible.

Figure 30:
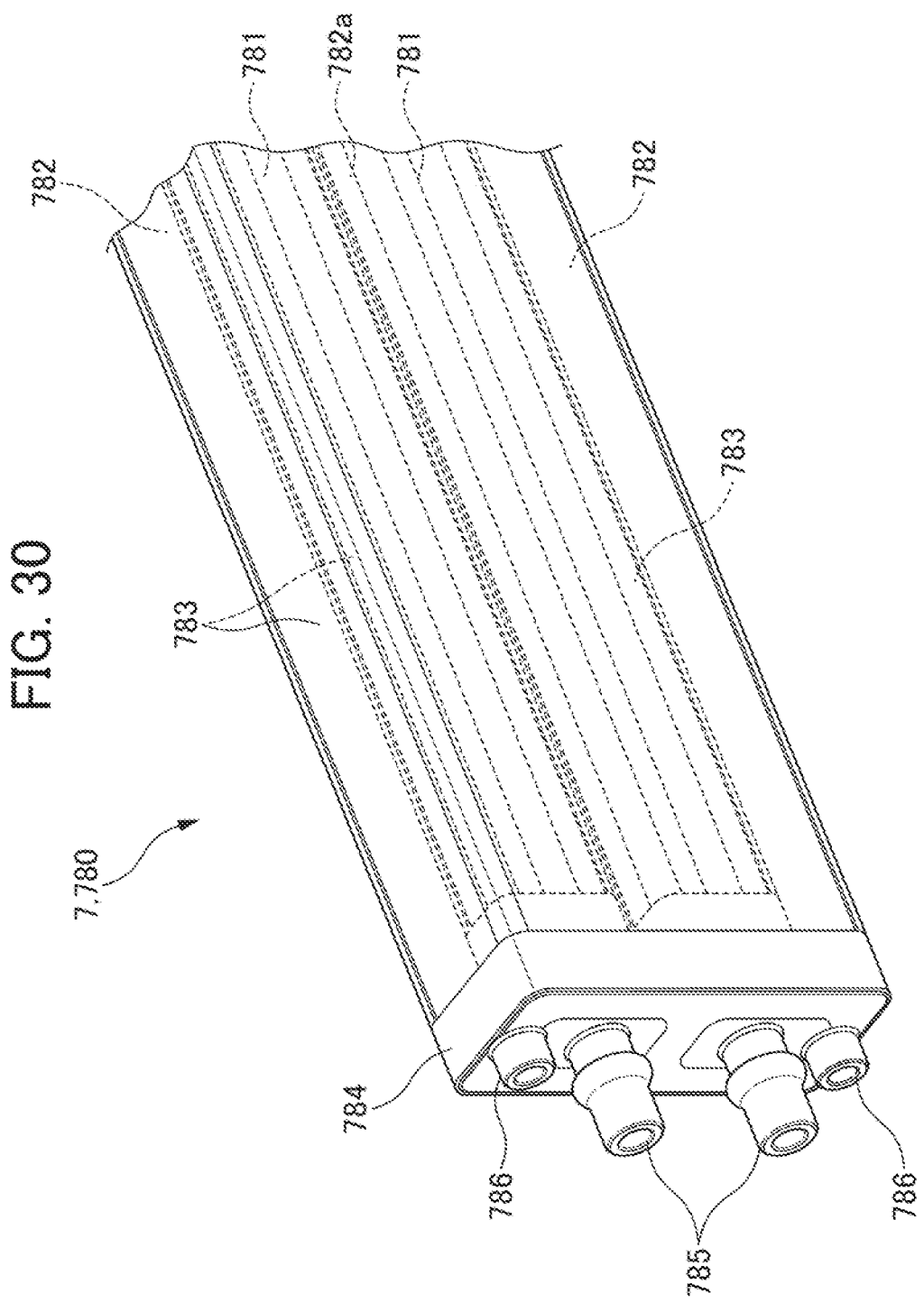
FIG. 30 is a perspective view showing main parts of yet another embodiment of the filling member.
Figure 31:
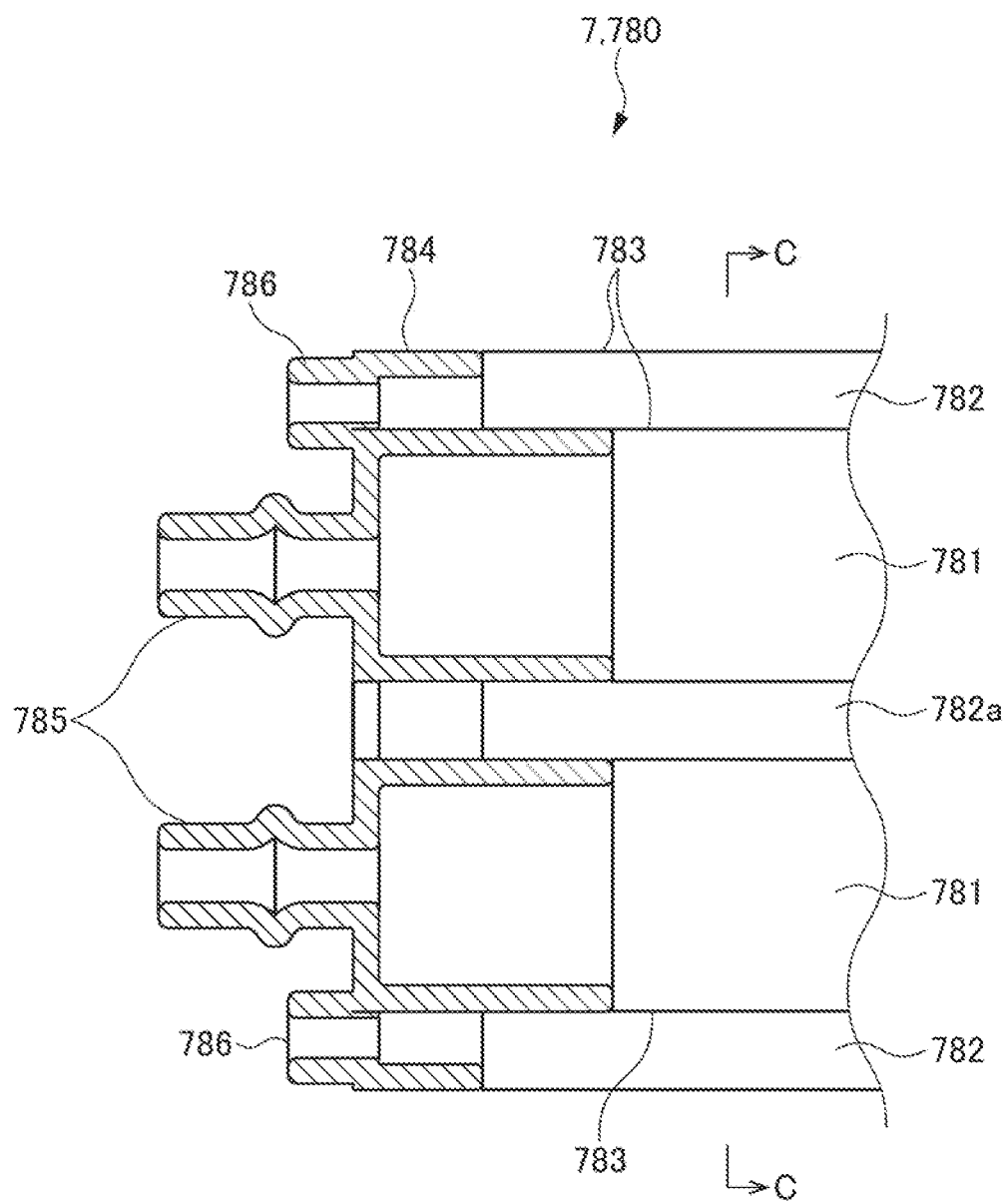
FIG. 31 is a principal cross-sectional view of the filling member shown in FIG. 30.
Figure 32:
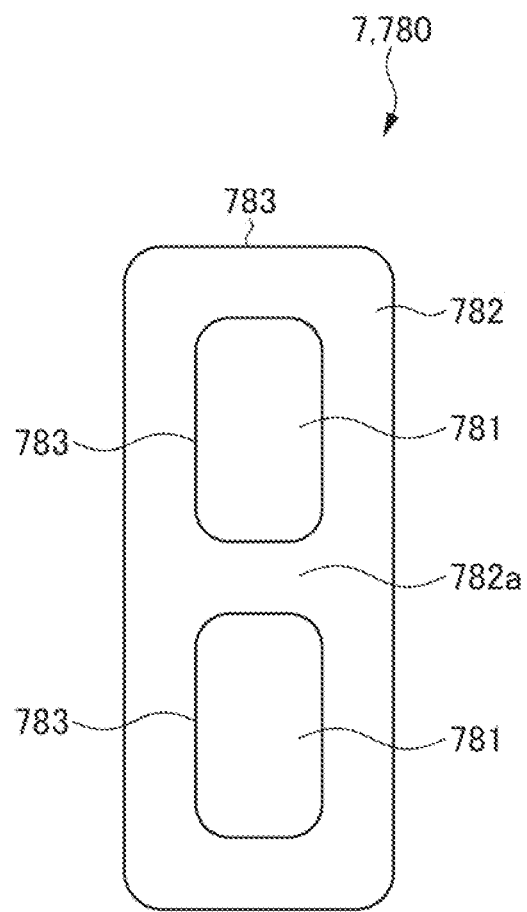
FIG. 32 is a cross-sectional view along the line C-C in FIG. 31.

The resin filled layer 782 can have a path part 782a traversing the gas filled layer 781, as shown in FIGS. 30 to 32. The path part 782a shown in the present embodiment extends over the length direction of the filling member 780. The path part 782a is provided along the width direction of the filling member 780, i.e. pressing direction (direction following the D2 direction) of the battery cell groups 6, 6, and divides into two above and below the gas filled layer 781 within the filling member 780. For this reason, the two first joint parts 785, 785 corresponding to the two gas filled layers 781, 781 are provided to the terminal part 784. In addition, to the terminal part 784 shown in the present embodiment, the two second joint parts 786, 786 are provided to be divided above and below, so that the curable resin sufficiently penetrates within the resin filled layer 782 containing the path part 782a. These joint parts 785, 786 also may be configured by female joint parts similarly to FIGS. 28 and 29.

The path part 782a, when the curable resin within the resin filled layer 782 cures, plays a role of integrally linking and reinforcing the left and right resin filled layers 782, 782, as shown in FIG. 32. By this path part 782a, the strength of the filling member 780 in the pressing direction towards the outer side wall 33 against the battery cell group 6 is raised. Therefore, it is possible to more stably retain the respective battery cell groups 6, 6 to the outer side walls 33, 33. It should be rioted that such a path part 782a may simply be formed partially (continuously) along the length direction of the filling member 780.

(Manufacturing Method of Battery Device)

The battery device 1 as explained above can be obtained by retaining the battery cell group 6 configured by laminating a plurality of battery cells 60 within the outer packaging 30. The battery cell groups 6 are arranged in parallel to the battery cell group accommodating parts 301, 301 between the two outer side walls 33, 33 of the outer packaging 30. Subsequently, the retaining mechanism 7 is arranged between the battery cell groups 6, 6 to apply pressure in directions pressing towards the outer side walls 33, 33 having the temperature-adjusting medium flow path 36 against the plurality of battery cell groups 6, 6. The battery cell group 6 is thereby pressed to the inner surface 33*a* which is the heat exchange surface of the outer side wall 33 to contact in a heat exchangeable manner, and this contact state is maintained to be retained within the outer packaging 30.

The battery device 1 obtained in this way can laminate with high density a plurality of battery cells 60 without leading to a size increase in the battery cell group 6. The battery device 1 does not require separately fixing the battery cells 60 in order to make the battery cells 60 contact the inner surface 33*a* of the outer side wall 33. For this reason, according to this production method, it is possible to make individual battery cells 60 contact against, the inner surface 33*a* of the outer side wall 33 in a heat exchangeable manner easily, and retain this contact state.

(Other Embodiments of Battery Device)

With the battery device 1 shown in the above embodiment, the two battery cell mounting parts 3, 3 are provided sandwiching the I/F box 2; however, the battery cell mounting part 3 may simply be provided to only either one side of the I/F box 2. In addition, the I/F box 2 and outer packaging 30 may be bodies without a temperature-adjusting medium channel.

In each embodiment above, the outer packaging 30 accommodating the battery cell group 6 is formed cylindrically; however, the outer packaging is not limited to a cylindrical shape. The outer packaging, for example, may be formed in a box shape (bathtub shape) having a removable lid at the top. In this case, it is possible to configure the battery cell group 6 within the outer packaging, by separately accommodating the battery cells 60 having the separator 61, within the outer packaging from above the outer packaging in an opened state removing the lid. In the case of the outer packaging having the intermediate wall 34, the recess 38 can be provided to be able to engage a convex part 618 of the battery cell group 6 from above.

The case of using the outer packaging of such box shape (bathtub shape) can also press the battery cell group 6 arranged in parallel towards two opposing outer side walls of the outer packaging, using the above-mentioned retaining mechanism 7. The battery cell group 6 can make the convex part 617 engage from the lateral direction with the recess 37 in the outer side wall similarly to the above-mentioned embodiment, by moving towards the outer side wall. The retaining mechanism 7 in this case may insert between parallel battery cell groups 6 from above the outer packaging, or may provide an opening in part of a wall part of the outer packaging arranged at both end sides in the lamination direction of the battery cell 60, and insert between the parallel battery cell groups 6 within the outer packaging from this opening.

EXPLANATION OF REFERENCE NUMERALS

1 battery device
210 side wall part (end plate)
30 outer packaging
33 outer side wall
36 temperature-adjusting medium channel (first temperature-adjusting medium channel)
4 end plate
6 battery cell group
60 battery cell
7 retaining mechanism
710 resin (retaining mechanism)
720 leaf spring (retaining mechanism)
730 coil (retaining mechanism)
731 temperature-adjusting medium channel (second temperature-adjusting medium channel)
742 fixing member
750 pressing member (retaining mechanism)
760 link mechanism (retaining mechanism)
761 support plate
762 connecting member
770 wedge mechanism (retaining mechanism)
771 through hole
772 wedge member
772*b* sloped surface
780 filling member (retaining mechanism)
781 gas filled layer
782 resin filled layer
782*a* path part
784 terminal part
785 first joint part (joint part)
786 second joint part (joint part)

The invention claimed is:

1. A battery device comprising:
an outer packaging having two outer side walls;
at least first battery cell group and a second battery cell group disposed in parallel between the two outer side walls, and
the first battery cell group and the second battery cell group each comprising a plurality of laminated battery cells that have at least one orthogonal surface that is an outer surface of the plurality of laminated battery cells and orthogonal to the lamination direction;
a retaining mechanism which is disposed between the first battery cell group and the second battery cell group, and retains the first battery cell group and the second battery cell group within the outer packaging, by applying a first pressure against the first battery cell group orthogonal surface in a first direction towards a first outer side wall and applying a second pressure against the second battery cell group orthogonal surface in a second direction opposite the first direction toward the second outer side wall, the first pressure and second pressure separate the first battery cell groups and the second battery cell groups,
wherein the outer packaging is an extrusion molded article with a direction following a lamination direction of the battery cells as an extruded direction, and
the plurality of battery cells are disposed in parallel in a direction orthogonal to the extrusion direction.

2. The battery device according to claim 1, wherein the two outer side walls respectively have a temperature-adjusting medium channel in which a temperature-adjusting medium capable of exchanging heat with the battery cells in the outer side walls flows.

3. The battery device according to claim 2, wherein the temperature-adjusting medium channel is provided inside of the outer side wall.

4. The battery device according to claim 1, wherein the retaining mechanism is configured from a resin which can expand by chemical reaction, or a resin which can fill into the outer packaging at a predetermined filling pressure, and applies pressure against the plurality of battery cell groups in a direction separating the battery cell groups and pressing towards the two outer side wall which are opposing, by expansion pressure or filling pressure of the resin.

5. The battery device according to claim 4 comprising, at a site adjacent to the resin retaining the battery cell group within the outer packaging, an escape space which permits infiltration of the resin upon deforming by way of load input to the resin.

6. The battery device according to claim 1, wherein the retaining mechanism is configured by a leaf spring of shape memory alloy, and wherein the leaf spring applies pressure against the plurality of battery cell groups in a direction separating the battery cell groups and pressing towards the two outer side walls which are opposing, by way of spring counterforce.

7. The battery device according to claim 1, wherein the retaining mechanism is configured by a coil having elasticity disposed so that an axial direction thereof follows a lamination direction of the battery cells, and
wherein the coil applies pressure against the plurality of battery cell groups in a direction separating the battery cell groups and pressing towards the two outer side walls which are opposing, by way of being elastically expanded in diameter.

8. The battery device according to claim 7, wherein the coil is expanded in diameter by being rotationally displaced in an opposite direction to a winding direction.

9. The battery device according to claim 7, wherein the coil consists of hollow wire having a heat transfer property, and inside of the hollow wire configures a second temperature-adjusting medium channel.

10. The battery device according to claim 1, wherein the retaining mechanism is configured by a cam member consisting of a rigid body having a cross-sectional shape in which a radius continuously changes from a center of rotation relative to a rotation direction, and
wherein the cam member applies a pressure against the plurality of battery cell groups in a direction separating the battery cell groups and pressing towards the two outer side walls which are opposing, by being disposed at a rotational displacement position at which the radius increases along the pressing direction of the battery cell group.

11. The battery device according to claim 10, wherein at least one end part of the cam member has a faxing member which maintains the rotational displacement position of the cam member.

12. The battery device according to claim 1, wherein the retaining, mechanism is configured by a pressing member capable of increasing width dimension in a pressing direction of the battery cell group by way of elastic deformation, and
wherein the pressing member applies pressure against the plurality of battery cell groups in a direction separating the battery cell groups and pressing towards the two outer side walls which are opposing, by way of being plastically deformed.

13. The battery device according to claim 1,
wherein the retaining mechanism is configured by a link mechanism having two parallel support plates disposed along a lamination direction of the battery cells, and a plurality of parallel connecting members which are rotatably connected over the two support plates, the link mechanism being capable of expanding an inter between the support plates by the support plates relatively moving in opposite directions from each other along the lamination direction of the battery cells, and
wherein the link mechanism applies pressure against the plurality of battery cell groups in a direction separating the battery cell groups and pressing towards the two outer side walls which are opposing, by way of expansion of the interval between the support plates.

14. The battery device according to claim 13, wherein end plates are respectively disposed at both ends in the lamination direction of the battery cells in the battery cell group, and
wherein the support plates of the link mechanism are maintained in a state expanding the interval, by being sandwiched between the end plates.

15. The battery device according to claim 1, wherein the retaining mechanism is configured from a wedge mechanism having a through hole which penetrates the outer packaging, and a wedge member having a sloped surface at a leading end, and
wherein the sloped surface of the wedge member inserted in the through hole applies pressure against the plurality of battery cell groups in a direction separating the battery cell groups and pressing towards the two outer side walls which are opposing, by way of contacting with the battery cell group.

16. The battery device according to claim 1,
wherein the retaining mechanism is configured by a filling member having a gas failed layer in which a gas is filled, and a resin filled layer disposed at an outer circumference of the gas filled layer, and in which curable resin is filled, and
wherein the filling member applies pressure against the battery cell group in a direction separating the battery cell groups and pressing towards the two outer side walls which are opposing, by the curable resin filled into the resin filled layer curing in a state pushing the battery cell group by way of pressure of the gas filled into the gas filled layer.

17. The battery device according to claim 16, wherein the filling member has, at a terminal part, a joint part for filling the gas into the gas filled layer, and a joint part for filling the curable resin into the resin filled layer.

18. The battery device according to claim 17, wherein the joint part is a female joint part.

19. The battery device according to claim 16, wherein the resin filled layer has a path part traversing the gas filled layer along the pressing direct of the battery cell group.

20. A method for manufacturing a battery device, comprising disposing in parallel a plurality of battery cell groups configured by a plurality of laminated battery cells respectively between two outer side walls of an outer packaging having the two outer side walls; and then retaining within the outer packaging the plurality of battery cell groups in a state pressed towards the two outer side walls, by applying pressure against the plurality of battery cell groups in a direction separating the battery cell groups and pressing towards the two outer side walls which are opposing.

* * * * *